United States Patent
Sollazzo Lee et al.

(10) Patent No.: US 9,851,240 B2
(45) Date of Patent: *Dec. 26, 2017

(54) PRECISION MEASUREMENT DISPENSER

(71) Applicants: Nicole Sollazzo Lee, Newport Beach, CA (US); William Patrick Conley, Long Beach, CA (US)

(72) Inventors: Nicole Sollazzo Lee, Newport Beach, CA (US); William Patrick Conley, Long Beach, CA (US)

(73) Assignee: Nicole Sollazzo Lee, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/716,307

(22) Filed: May 19, 2015

(65) Prior Publication Data

US 2016/0018250 A1    Jan. 21, 2016

Related U.S. Application Data

(63) Continuation-in-part of application No. 13/974,193, filed on Aug. 23, 2013, now Pat. No. 9,052,228, (Continued)

(51) Int. Cl.
*G01G 13/00* (2006.01)
*G01G 13/02* (2006.01)
(Continued)

(52) U.S. Cl.
CPC ............ *G01G 13/02* (2013.01); *G01F 11/20* (2013.01); *G01F 11/24* (2013.01); *G01G 19/306* (2013.01)

(58) Field of Classification Search
CPC ...... G01G 13/02; G01G 19/306; G01F 11/20; G01F 11/24
(Continued)

(56) References Cited

U.S. PATENT DOCUMENTS 2,991,870 A * 7/1961 Griffith ................. B65D 88/68
198/533
3,182,919 A * 5/1965 Geerlings ............... B01F 5/241
241/101.6

(Continued)

OTHER PUBLICATIONS

International Search Report and the Written Opinion of the International Searching Authority received from the European Patent Office in International Application No. PCT/US2016/033031 dated Sep. 12, 2016.

*Primary Examiner* — Lien Ngo
(74) *Attorney, Agent, or Firm* — The Marbury Law Group, PLLC

(57) ABSTRACT

A precision measurement dispenser provides for storage of a granular bulk material in a storage container that is preferably airtight. The granular material is held in a storage container which feeds a dispensing section that is preferably positioned within the storage container. The dispensing section selectively dispenses the ingredient by gravity to a weighting tray of a scale. The ingredient is dispensed by weight. The storage dispensing unit may also include a display and keypad for entry of a desired quantity of ingredient to be dispensed, and optionally which of plural ingredients to be dispensed. A controller can convert a requested volumetric measure to an equivalent weight measure, and dispense by weight in place of volume. The storage dispensing unit further optionally includes pressure control, temperature control, and/or humidity control on the storage container. The dispensing section uses screw, roll, vibration, or shuttle mechanisms for precise dispensing of material.

27 Claims, 30 Drawing Sheets

Related U.S. Application Data which is a continuation-in-part of application No. 12/399,789, filed on Mar. 6, 2009, now Pat. No. 8,523,014.

(60) Provisional application No. 61/034,277, filed on Mar. 6, 2008.

(51) Int. Cl.
*G01G 19/30* (2006.01)
*G01F 11/20* (2006.01)
*G01F 11/24* (2006.01)

(58) Field of Classification Search
USPC .... 222/77, 29, 44, 50, 57, 58, 60, 413, 412, 222/226–229, 235–242, 216–219; 700/239
See application file for complete search history.

(56) References Cited

U.S. PATENT DOCUMENTS

| | | | |
|---|---|---|---|
| 4,193,116 A | 3/1980 | Funk | |
| 4,669,886 A | 6/1987 | van Beek | |
| 4,696,329 A * | 9/1987 | Izzi | B65B 1/32 141/1 |
| 4,708,268 A * | 11/1987 | Wurtz | G01F 13/00 222/238 |
| 4,723,614 A * | 2/1988 | Lahti | G01G 7/06 177/120 |
| 4,756,348 A | 7/1988 | Moller | |
| 4,852,028 A | 7/1989 | Korpela et al. | |
| 4,867,258 A * | 9/1989 | Narukawa | G01G 13/06 141/83 |
| 4,942,983 A * | 7/1990 | Bradbury | F25C 5/007 141/360 |
| 5,240,324 A * | 8/1993 | Phillips | B01F 5/265 222/55 |
| 5,381,837 A * | 1/1995 | Kurosu | B01F 13/1055 141/103 |
| 5,460,209 A | 10/1995 | Jandura et al. | |
| 5,524,796 A * | 6/1996 | Hyer | B65G 33/18 198/662 |
| 5,542,583 A | 8/1996 | Boyer et al. | |
| 5,564,329 A * | 10/1996 | Tomimatsu | B65G 65/46 222/238 |
| 5,835,982 A * | 11/1998 | Lanaro | G01G 17/04 141/101 |
| 6,056,027 A | 5/2000 | Patterson | |
| 6,336,573 B1 | 1/2002 | Johanson | |
| 6,655,421 B2 * | 12/2003 | Kohashi | B65B 1/32 141/145 |
| 6,725,889 B2 * | 4/2004 | Perez Vales | A47F 1/035 141/104 |
| 6,793,387 B1 * | 9/2004 | Neas | B01F 13/1058 141/104 |
| 6,863,913 B1 | 3/2005 | Navin et al. | |
| 6,981,619 B2 | 1/2006 | Moretto | |
| 7,017,624 B2 * | 3/2006 | Reinsch | G01G 13/18 141/198 |
| 7,051,907 B2 | 5/2006 | Brincat | |
| 7,075,019 B2 | 7/2006 | Bergman et al. | |
| 7,206,664 B2 * | 4/2007 | Schmid | B01F 13/1055 700/239 |
| 7,311,223 B2 * | 12/2007 | Post | B01F 13/1058 222/1 |
| 7,614,429 B2 | 11/2009 | Pluvinage et al. | |
| 7,980,277 B2 | 7/2011 | Amano | |
| 8,523,014 B2 | 9/2013 | Sollazzo | |
| 8,584,714 B2 * | 11/2013 | Gaultney | B01F 13/1005 141/100 |
| 9,417,114 B2 * | 8/2016 | Geier | G01G 15/00 |
| 2003/0230355 A1 * | 12/2003 | Bartholomew | A45D 44/00 141/104 |
| 2008/0164274 A1 * | 7/2008 | Stettes | G07F 13/065 221/5 |
| 2010/0001019 A1 | 1/2010 | Sollazzo | |
| 2013/0334247 A1 | 12/2013 | Lee et al. | |

* cited by examiner

PRECISION MEASUREMENT DISPENSER

RELATED APPLICATIONS

This application is a continuation-in-part of U.S. patent application Ser. No. 13/974,193, filed on Aug. 23, 2013, entitled PRECISION MEASUREMENT DISPENSER, now issued as U.S. Pat. No. 9,052,228 on Jun. 9, 2015, the entire disclosure of which is hereby incorporated by reference for all purposes, and which is a continuation-in-part of U.S. patent application Ser. No. 12/399,789 filed Mar. 6, 2009, entitled PRECISION MEASUREMENT DISPENSER, and now issued as U.S. Pat. No. 8,523,014, the entire disclosure of which is hereby incorporated by reference for all purposes, and which claims the benefit under 35 U.S.C. §119(e) of U.S. Provisional Patent Application Ser. No. 61/034,277, filed Mar. 6, 2008, entitled PRECISION MEASUREMENT DISPENSER, the entire disclosure of which is hereby incorporated by reference for all purposes.

BACKGROUND

The present disclosure relates to the field of food preparation, and more particularly to an apparatus for the bulk storage and precision metered dispensing of granular food ingredients.

Food preparation often involves using basic ingredients that are in granular form, e.g., flour of various types and origins, sugar of various types and origins, baking soda, baking powder, ground spices, powdered seasonings, or the like. Traditionally, granular ingredients are measured by volume, and many or even most recipes are written accordingly.

However, it is known that measuring recipe ingredients by volume has drawbacks. For example, the ingredients may settle during storage, or may be loaded differently into the measuring vessels be different individuals, and accordingly the density will change. Therefore, equal volumes of an ingredient may have different weights, affecting the precision of the preparation.

SUMMARY

It is an object of the present disclosure to overcome these and other deficiencies in the known art. Therefore, the present disclosure provides a storage dispensing unit for storage of a granular bulk material in a standard or airtight (hermetic) storage container. The granular material is held in a storage container which feeds an included dispensing section. The dispensing section selectively dispenses the ingredient downward to a base, which optionally includes a weighing tray or a scale. The ingredient is dispensed by weight. The storage dispensing unit also may include a display and a keypad for entry of a desired quantity of ingredient to be dispensed, and optionally which of plural ingredients to be dispensed. A controller can convert a requested volumetric measure to an equivalent weight measure, and dispense by weight in place of volume. The storage dispensing unit further optionally includes pressure control on the storage container, i.e., vacuum, and maintains an airtight or hermetic seal when not actively dispensing. Optionally, temperature and/or humidity may also be controlled to enhance the shelf life of various stored ingredients. The dispensing unit may be used for storing ingredients or as a precise dispensing apparatus, wherein ingredients are only temporarily stored for the purpose of dispensing a precise amount of the ingredient.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain features of the invention. These and other features and advantages will become apparent from the following description of the disclosure which refers to the accompanying drawings, wherein like reference numerals refer to like structures across the several views.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

Provided according to the present disclosure is a storage dispenser unit, generally 10, for a bulk granular product. We refer herein to flour as the exemplary ingredient merely as convenience, however it will be appreciated by those skilled in the art that the present disclosure is applicable to any other granular or similar substance used in recipes, including but not limited to sugar, brown sugar, sweeteners (e.g., sugar substitutes), salt, starch (e.g., corn starch, potato starch, etc.), cocoa powder, carob powder, egg powder (e.g., egg white, yolk, and whole egg powders), maltodextrin, sweet dairy whey, tapioca, gelatin, textured vegetable protein (TVP), spices and other seasonings, rice, oats, beans, grains, couscous, dried pastas, dried fruit, dried vegetables, nuts, chips (e.g., chocolate chips, butterscotch chips, etc.), baking powder, baking soda, cream of tartar, bread crumbs, batter mixes, powdered milk, pudding mixes, dry yeast, dry cereal, candy, and seeds (e.g., sesame seeds, alfalfa seeds, chia seeds, flax seeds, etc.).

Figure 1:
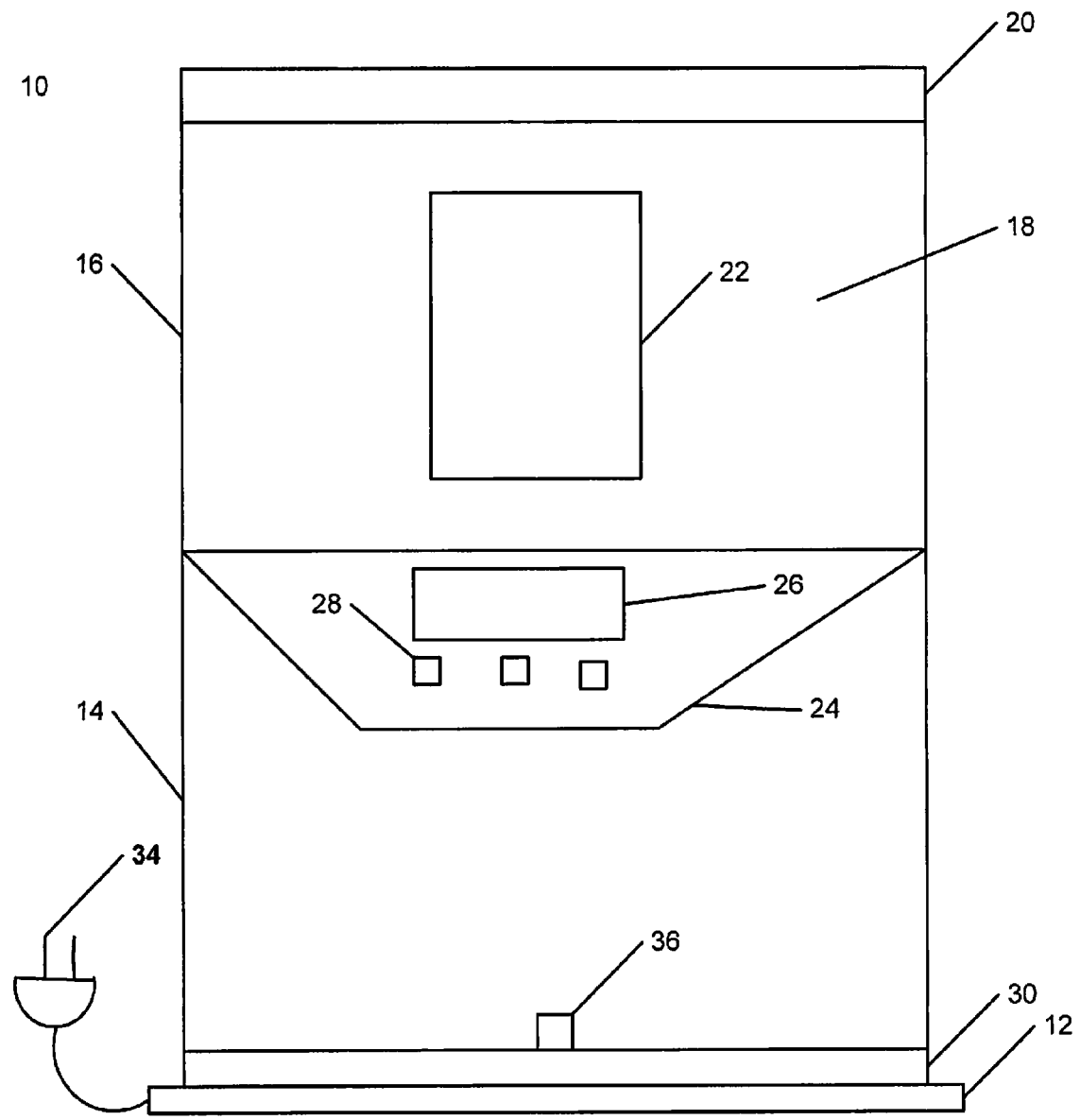
FIG. 1 illustrates a storage dispenser unit according to an exemplary embodiment of the present disclosure in front elevation view.
Figure 2:
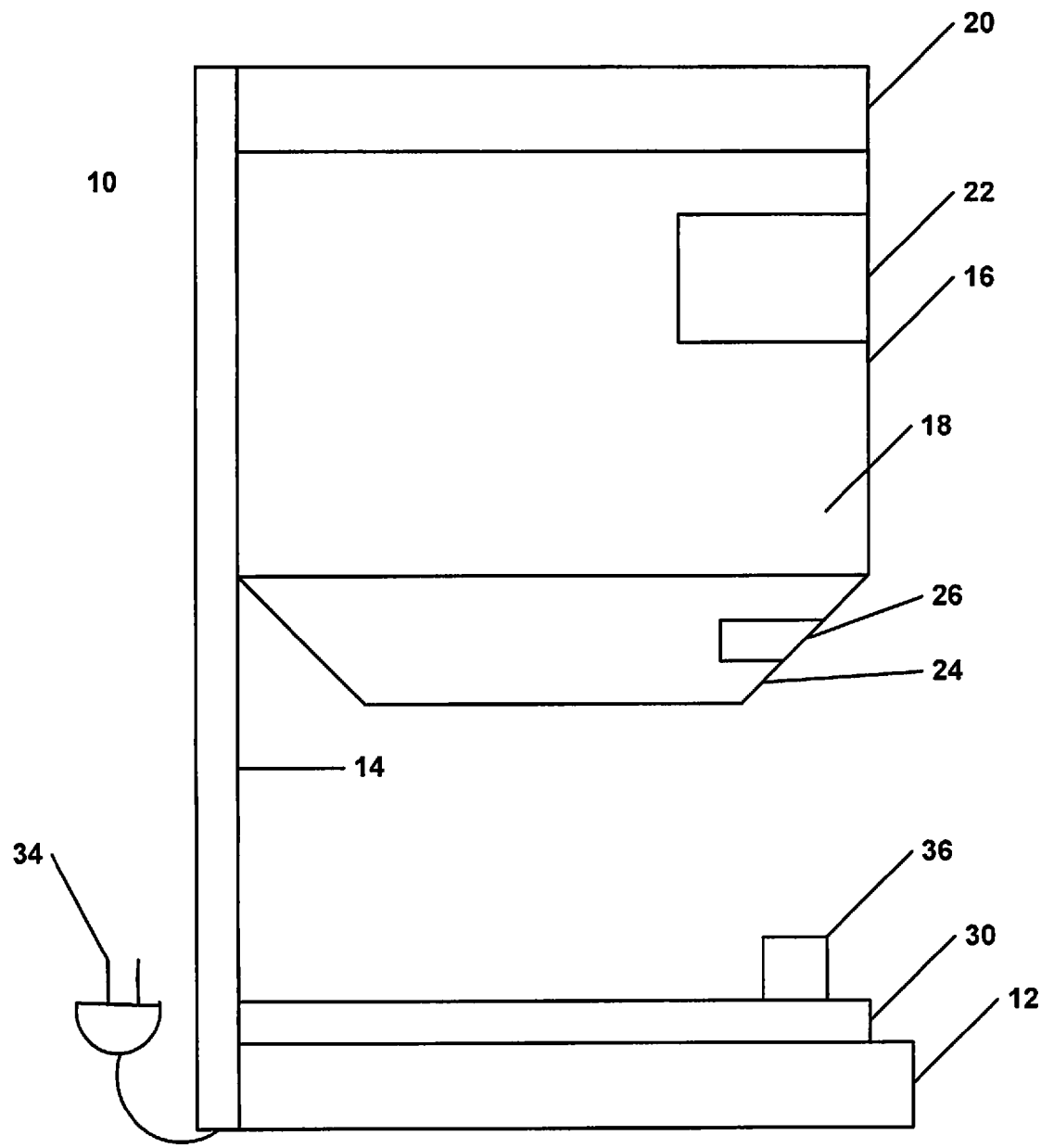
FIG. 2 illustrates the storage dispenser unit of FIG. 1 in a side elevation view.

FIGS. 1 and 2 illustrate a storage dispenser unit 10 that may include a base 12 at its bottom, and a stand 14 rising from the base 12. The stand 14 supports a canister 16 above the base 12. In a further embodiment the stand 14 may be collapsible to reduce the height of the storage dispenser unit 10 when it is not in use. Alternately or additionally the canister 16 and/or the stand 14 may be detachable from the stand 14 and/or the base 12, respectively, also to facilitate storage.

The canister 16 includes a storage compartment 18, sealed by cover 20. The seal of cover 20 is preferably airtight or hermetic, yet releasable. Optionally a translucent or transparent window 22 is provided in the storage compartment 18 to permit visual determination of the contents of the storage compartment 18, i.e., their type and/or quantity. Alternately or additionally the storage compartment itself is transparent or translucent to permit the visual identification. The storage compartment 18 may also be formed of any suitable material (plastic, ceramic, metal, wood, etc.) and include colors, designs, graduated markings, and labels (including frames or other means for holding labels, such as stick-on and magnetic, as well as label areas formed of dry-erase or chalkboard for hand labeling). The storage compartments 18 may vary in size and/or shape, and differing properties of the storage compartments 18 may aid in distinguishing the materials within them.

Beneath the storage compartment 18 is a dispensing section 24. The dispensing section receives the stored bulk goods from the storage compartment 18 above and selectively dispenses them below in the direction of the base 12. Provided on the dispensing section 24 are a display 26, and keypad 28, although either or both may be located elsewhere on the storage dispenser unit 10, or even remote from it. A power cord 34 connects with an external electric source to provide power as necessary to the storage dispenser unit 10. Alternately or additionally, electric power as needed would be sourced from internal batteries, solar panels or other available means.

Flour is commonly sold in retail quantities of 5 lbs. Therefore in one embodiment, storage compartment 18 is preferably sized to accommodate approximately 5 lbs. (2286 g) of flour, or at a common equivalent volume of 0.826 lbs. per 3 cups for all-purpose flour, approximately 18.2 cups (262.2 cubic inches; 4.296 liters). Additional space may be provided as a matter of convenience. Other sizes may be chosen as desired, or derived for contents other than flour, or for other applications. For industrial applications, larger storage compartments 18 capable of handling higher quantities of granular material may be desirable.

The base 12 includes a surface that can support a vessel 32 to receive the dispensed material. In one embodiment, the base includes a scale (not shown) having a weighing tray 30. For the embodiment described above adapted to store and dispense 5 lbs. of flour, the scale preferably has a resolution of one-eighth (0.125) oz. (1 g), preferably smaller than the smallest amount to be dispensed, and a maximum capacity of 4 lbs. (1.8 kg), preferably larger than the largest amount to be dispensed. The weight on the weighing tray may be displayed on the display 26. Optionally, the displayed weight can be converted between English and metric units. The weighing tray 30 is preferably removable, for example for cleaning, and preferably is constructed of stainless steel. For applications involving larger quantities of material, the scale resolution may be modified, but should still have a resolution smaller than the smallest amount to be dispensed, and a maximum capacity preferably larger than the largest amount to be dispensed.

The storage dispenser unit also includes a controller (not shown) which receives data input via the keypad or another means, and receives data from the scale. The controller directs the operation of the dispensing section 24 and/or the display 26. In a common mode of operation, the user would place a vessel 32 on the weighing tray 30 beneath the dispensing section 24. The scale may measure the weight of the vessel 32 before dispensing as the tare. Tare may also be manually set by the user depressing button 36 with the vessel 32 in place on the weighing tray 30. Tare button is 36 positioned in the exemplary embodiment on the base 12, but may also be located elsewhere on the storage dispenser unit 10, or remote from it.

Using the keypad 28, the user would enter a quantity and units to be dispensed, and in some embodiments, the type of ingredient to be dispensed. Moreover, the controller can accept a desired quantity given in commonly used volumetric units, and by use of a stored conversion factor, lookup table, or similar tool, convert to weight measure and dispense according to an equivalent weight. The keypad optionally has dedicated confirmation means, for example a single-purpose 'dispense' button, or a multi-purpose button to be depressed at an appropriate time, to confirm that dispensing is to begin, in order to avoid inadvertent dispensing without an appropriate vessel 32 in place to receive the ingredient. It will be noted that the particular order of steps described above may be altered without departing from the scope of the present disclosure.

Having received a desired quantity (and optionally type) of ingredient, the controller activates the dispensing section 24 to release the desired quantity. The controller receives feedback via the weighting tray 30 of the scale as to the weight of ingredient dispensed. The rate of dispensing can be controlled to prevent over-dispensing the selected ingredient due to feedback delays at the scale, controller, and/or dispensing section 24. The controller further optionally includes storage to store certain present quantities of one of more ingredients, i.e., recipes, which can be recalled through the keypad 28 and dispensed in a consolidated operation.

In another embodiment, the function of weighing the ingredient for dispensing the selected quantity is accomplished internally to the dispensing section 24. In this embodiment the dispensing section 24 weighs certain quantity of the ingredient internally, and dispenses the weighed amount below itself. In this embodiment, the scale to confirm the accuracy of the quantity dispensed is internal to the dispensing section 24, and the weighing occurs before the ingredient is released from the dispensing section 24. In this embodiment, the scale and weighing tray 30 may be provided as well, for the convenience of the user. Additionally, they may be incorporated into the dispensing process as a verification of the dispensed quantity.

As noted above, cover 20 preferably maintains an airtight seal of the storage compartment 18, to preserve the freshness of the food ingredient stored therein. Optionally, once sealed, a vacuum may be applied to the storage compartment, for example by an internal or externally-connected vacuum pump (not shown) to help maintain the freshness of the stored ingredient. More preferably, the storage dispenser unit 10 may include temperature control, e.g., heating or cooling elements, to avoid extremes of temperature to further promote and maintain the freshness of the stored food ingredient. In certain embodiments, the cover 20 may also include elements to control humidity within the storage compartment 18. For example, a compartment or other means for providing a desiccant or humectant material to the cover 20 may be used to reduce or increase humidity within the storage compartment 18.

Flour has been described herein as an exemplary ingredient, but the foregoing apparatus is applicable for the storage and dispensing of virtually any granular or fluid substance. Among food preparation ingredients, the present apparatus is useful for storage and dispensing of flour, sugar, baking powder, baking soda, oats, rice, peas, and nuts, just to name a few. Moreover, there are additionally applications outside the kitchen where the precise dispensing of bulk material, preferably by weight, would be desirable.

In particular, an embodiment is contemplated wherein a plurality of ingredients are stored and selectively dispensed. This is particularly applicable to spices and flavorings, or other ingredients that are typically used in smaller quantities than flour, sugar, or the like. Accordingly, the size of storage necessary for convenient and usage of such small-quantity ingredients is reduced. Plural ingredients may be stored separately in a single unit that is not excessive in size. The user may select the ingredient to be dispensed along with the quantity via keypad 28. Stored recipes consisting of several ingredients may be included or user-input for added convenience as well. The measures to enhance shelf-life discussed above are equally applicable to the plural-ingredient embodiment.

In a further embodiment of the present disclosure, a precision measurement dispenser (PMD) is a precision measuring converter and output device for dry goods such as flours and grains or other granular substances. One of its primary purposes is to eliminate the need for measuring cups or guesswork between units of measurement. The PMD uses the same amount of counter space (e.g., footprint) as a standard canister, may have an added feature of adjustable height to collapse into the same overall space as a conventional canister of similar volume. Is also may extend vertically to accommodate bowls or containers of various sizes.

An internal scale converts cups to grams, in addition to other conversions. A digital display shows introduced and converted amounts; interchangeable canisters can be reserved and stored according to their contents. An internal processor may display the contents of each interchangeable canister, aiding in proper dispensing and conversion. A vacuum seal on the canister may allow for long-term storage.

An air-sealed chamber dispenses directly into a bowl or vessel of choice. The PMD can be used to measure and store various types of materials such as flours or grains. The PMD may be battery, solar or cord-powered.

Figure 3:
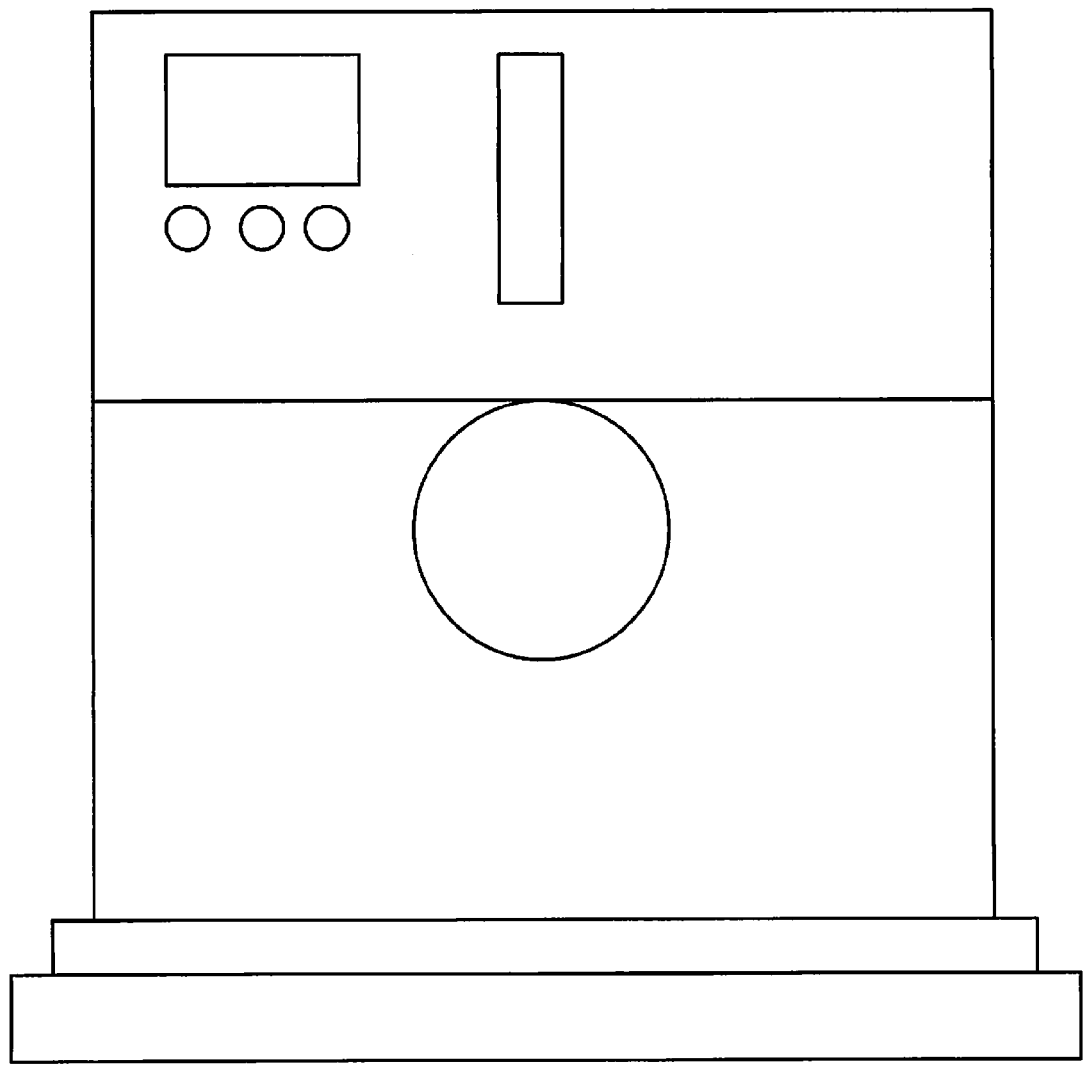
FIG. 3 illustrates an alternate embodiment of the present disclosure having a screw-feed dispenser.

An upper part comprises an interchangeable storage/input container which slides vertically and is held in place with a ratcheting mechanism; Hinged feed-door in top; Window gauge or optionally a transparent or translucent canister; LCD readout; Control buttons or touch screen controls for conversion of cups-to-gram, ounces-to-grams, pounds-to-grams, grams-to-ounces, gram-to-pounds, and other calculations including internal calculations executed to convert a requested volumetric quantity of material to a corresponding weight; Processor and scale inside upper housing which surrounds the storage/input container; Cylinder with airlock and feed-screw; Supporting middle section; Output base with optional separable output vessel. See FIG. 3

In the function of this further embodiment, a bowl or other container is placed on the PMD's output base. The PMD may be adjusted to the height of the output container. Flour or other dry granular substance is either previously-stored or poured into top of the container. If previously-stored, the container may be separable and attached to the PMD at the time of use. Using the control buttons or touch screen controls, the user enters the amount desired and the output measurement desired. The processor may calculate the output and a LCD readout shows the exact amount to be dispensed, in the target measurement, and dispenses the amount into the bowl in the output base.

Figure 4:
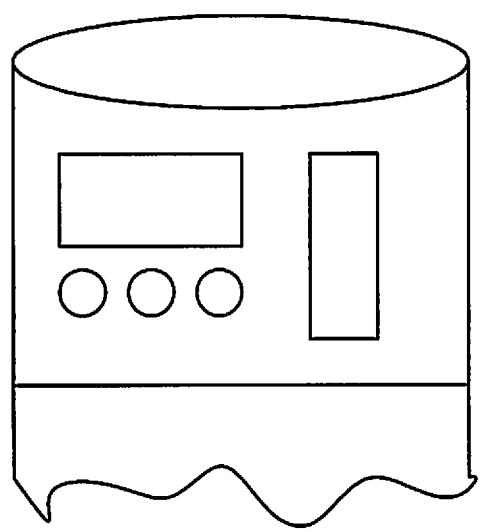
FIG. 4 illustrates an upper storage container portion of the embodiment shown in FIG. 3.
Figure 5:
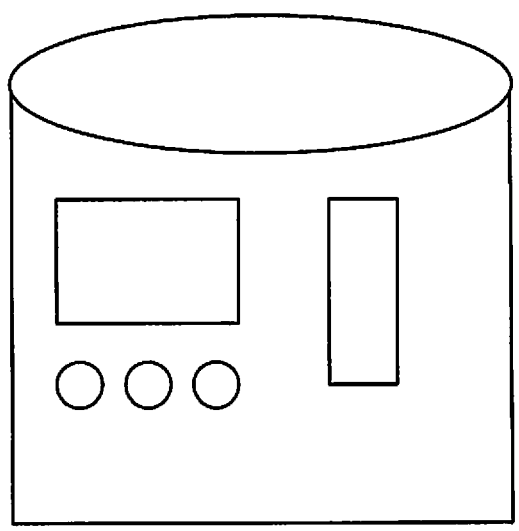
FIG. 5 illustrates a view of the control buttons or touch screen controls associated with the embodiment of FIG. 3.
Figure 6:
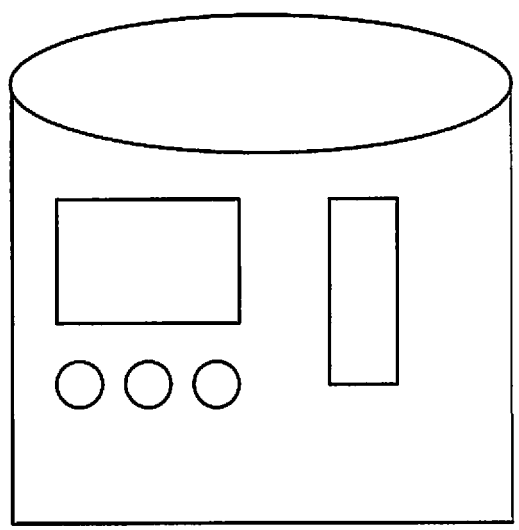
FIG. 6 illustrates a view of the display associated with the embodiment of FIG. 3.
Figure 7:
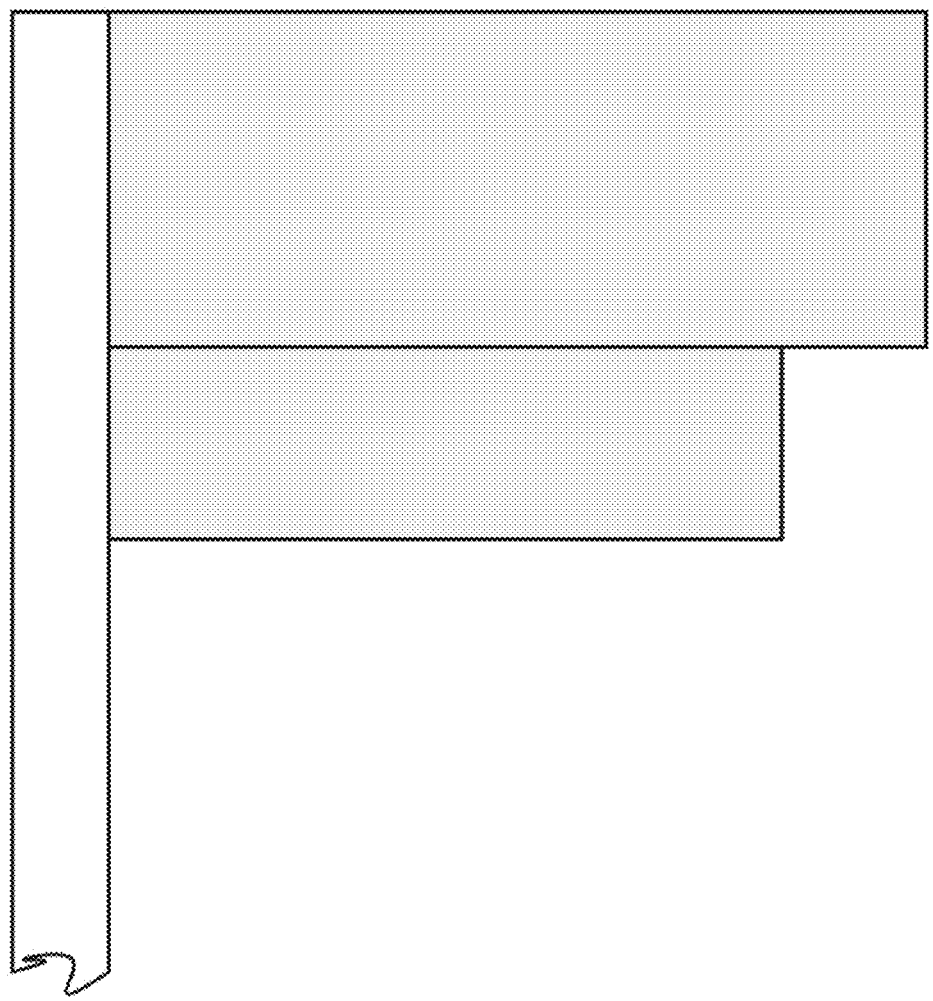
FIG. 7 illustrates a detailed side elevation view of the airlock and screw feed associated with the embodiment of FIG. 3.

The user pours the substance to be measured into the input container (FIG. 4). Using the control buttons or touch screen controls on the container cylinder (FIG. 5), the user enters the desired output amounts (for example, 1 cup). The calculator inside the unit's upper part (not pictured—internal) computes the output in the desired measurement and displays that in the LCD readout (FIG. 6). At that point the door of the inner airlock chamber (FIG. 7) opens to receive the granular substance and the feed screw (FIG. 8) of a screw feed apparatus turns to fill the cylinder.

Figure 8:
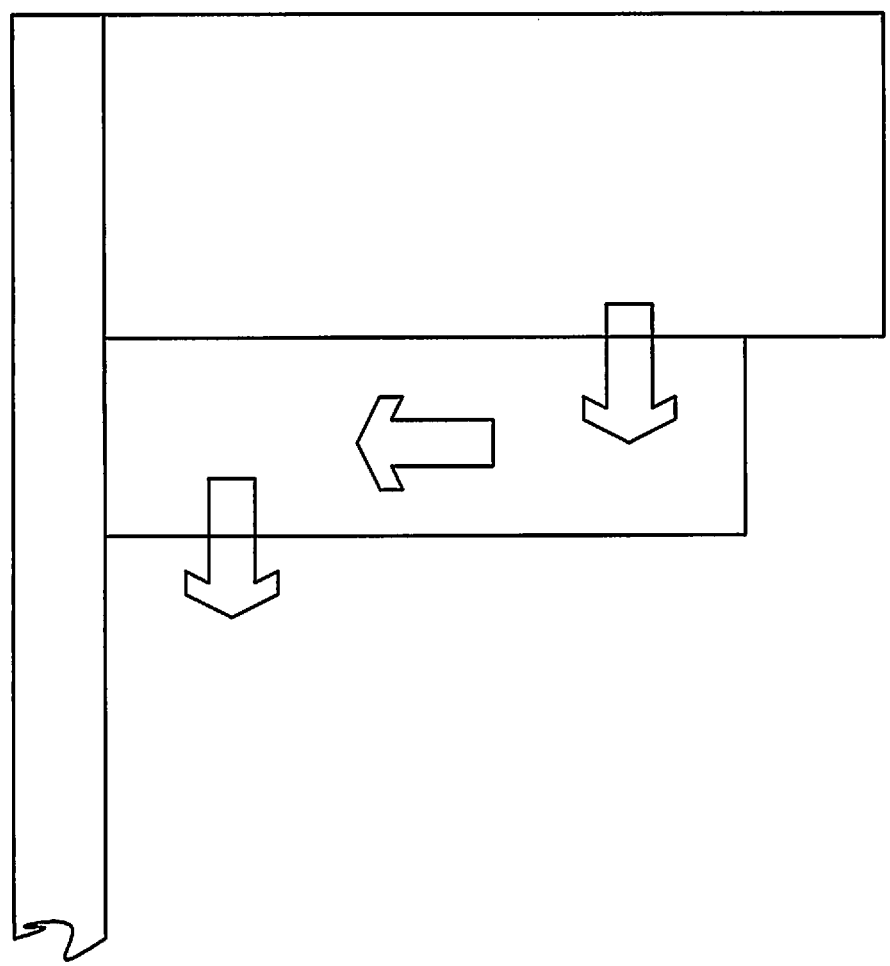
FIG. 8 illustrates a perspective view of the airlock and screw feed associated with the embodiment of FIG. 3.

The airlock chamber rotates so that the door faces downward and the first part of the substance is delivered. The airlock chamber rotates to receive more of the granular substance (if necessary), and the feed screw continues in the other direction, pushing more of the substance into the cylinder (FIG. 8). The airlock chamber rotates again, repeating the process while the feed screw continues moving in alternate directions to quickly fill the airlock chamber. Thus the airlock chamber works fluidly with the feed screw to alternately receive and expel the substance until the desired amount is finally deposited. This cycle repeats until desired weight is subtracted from the storage container. The feed screw may be capable of measuring out accurate measurements down to the desired precision, such as 0.125 oz.

The remaining granular substance in the container can then be further meted out, or it can be stored, optionally after re-establishment of a vacuum seal within the storage container. An internal switchboard gives the user ability to assign each storage/input container to a particular ingredient. The storage/input container slides on and off the unit vertically and can be interchanged with other containers for ease of cleaning and measuring of differing materials.

In the present embodiment, the following material selections are contemplated, though others may be used. The upper part with an interchangeable input container—ABS plastic. Hinged feed-door—transparent polycarbonate. Window gauge—transparent polycarbonate. LCD readout—per component supplier/manufacturer; Control buttons—ABS plastic; Processor and scale—per component supplier/manufacturer; Cylinder with airlock—transparent polycarbonate; Feed-screw—transparent polycarbonate, however some ingredients may require stainless steel; Supporting middle section—ABS plastic; Output base—ABS plastic. If the control buttons are replaced with a touch screen, the materials for the touch screen include both plastic and glass, as well as combinations.

With the shape and size of this particular product, injection molding would be the choice of manufacturing. Injection molding is the most commonly practiced plastic processing method in the plastics industry. This process can produce all different shapes and sizes of plastic products, and can produce the most complex of plastic parts. Injection molding uses force to push plastic into a cold steel mold to form the part being produced.

In order to reduce the manufacturing and retail price of the product, it is possible to construct a simpler interchangeable storage/input container without parts such as scale, processor, temperature control, and/or readout. Reserving these parts for only the non-interchangeable base unit may reduce retail costs for units with multiple storage containers. The storage containers may be configured to retain the optional vacuum seal upon removal from the PMD. This would result in a base unit with incorporated scale, motor, processor and LCD readout (and optional temperature control and vacuum pump). The base unit and processor may receive information as to the contents of a particular container from the interchangeable container, and the processor may direct the dispensing section accordingly.

Humidity control is contemplated for the present PMD, notwithstanding the implied cost of an associated compressor and refrigeration unit for condensing and removing humidity. As an alternative cooling unit a heat pipe may be employed, similar to those used in computer-processor cooling, notwithstanding the cost. Humidity control may also be achieved by use of desiccants and humectants (such as in a container cover).

A significant improvement over prior art devices may be realized by incorporating the dispensing section 24 into the storage container 18. Such an embodiment may eliminate cross-contamination since the parts that touch the material will stay with the container at all times. Power for the mechanism may be provided by the storage dispensing unit base through mechanical couplings, electrical connections, or the like. The embodiment of FIGS. 1-8, as well as further embodiments described herein may thus be configured with the dispensing section mechanism integrated or otherwise included into the storage compartment 18.

Figure 9A:
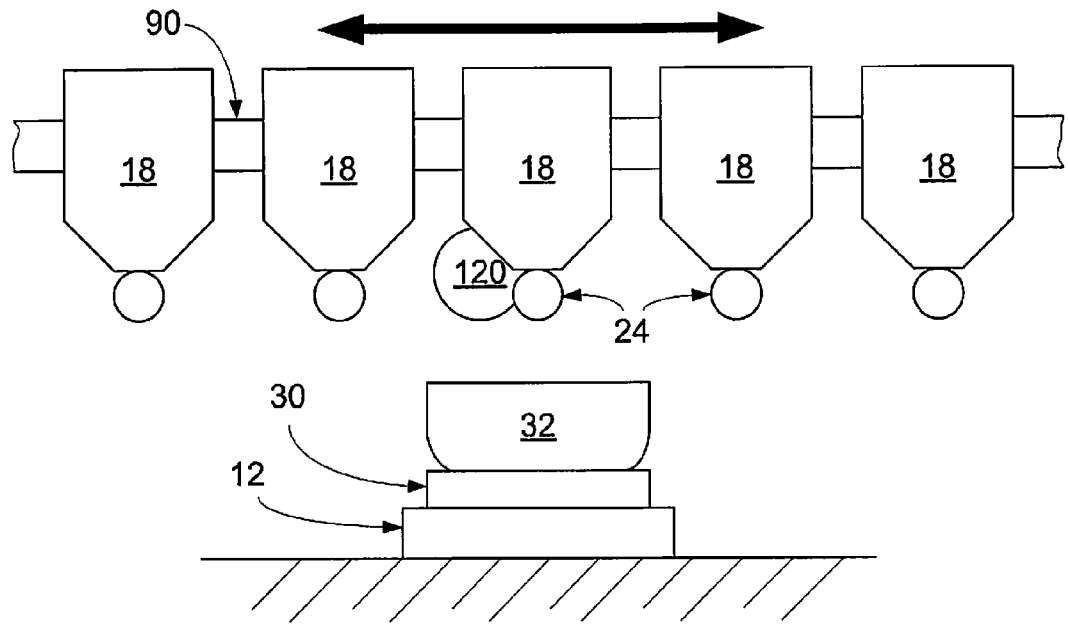
FIG. 9A illustrates an embodiment of the disclosure having a plurality of movable storage compartments associated with a single motor, base, and weighing tray that are stationary.

FIG. 9A schematically illustrates an embodiment wherein a single base unit interacts with multiple storage compartments 18 that each include a dispensing section mechanism 24. In this embodiment, a stationary base unit comprises base 12, a scale section or weighing tray 30, and a motor unit 120. The vessel or bowl 32 is placed on the weighing tray 30 and the scale zeroed upon determination of the tare (not illustrated). Multiple storage compartments 18 are mounted for movement via a rail or rotating element 90. The movement may be manual or controlled by a processor or controller (not shown) of the base unit so that material can be dispensed from the various storage compartments 18. When a storage compartment 18 is positioned to interact with the base unit, the dispensing section mechanism 24 interfaces with a drive unit or motor 120 in order to dispense material under the control of the base unit. While illustrated as having a particular number of uniform sized storage containers 18, any number and configuration of storage containers 18 may be employed.

Figure 9B:
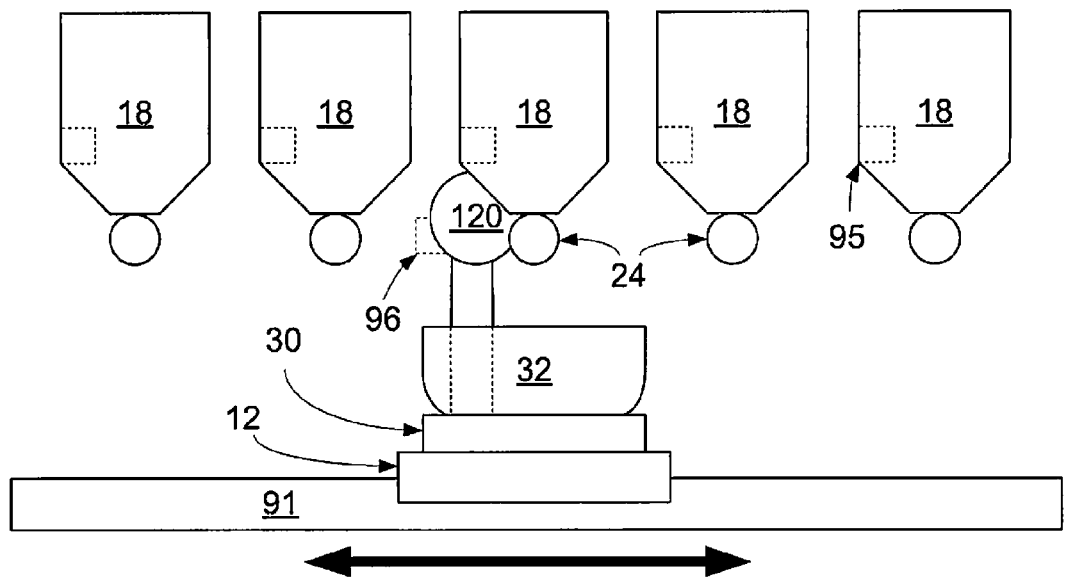
FIG. 9B illustrates an alternate embodiment of the disclosure having a plurality of stationary storage compartments associated with a single motor, base, and weighing tray that moves along a track.

FIG. 9B schematically illustrates another embodiment wherein a single base unit interacts with multiple storage compartments 18 that each include a dispensing section mechanism 24. In this embodiment, a movable base unit comprises base 12, a scale section or weighing tray 30, and a motor unit 120 that are mounted on a translational means such as a rail 91. The vessel or bowl 32 is placed on the weighing tray 30 and the scale zeroed upon determination of the tare (not illustrated). Multiple storage compartments 18 are positioned in a fixed manner relative to one another and the base unit is moved in order to interact with the various storage compartments 18. The movement may be manual or controlled by a processor or controller (not shown) of the base unit so that material can be dispensed from the various storage compartments 18. When the base unit is positioned to interact with a storage compartment 18, the drive unit or motor 120 interfaces with dispensing section mechanism 24 in order to dispense material under the control of the base unit. While illustrated as having a particular number of uniform sized storage containers 18, any number, size, and configuration of storage containers 18 may be employed.

Optionally, each of the plurality of storage containers may include an identifier 95 and the base unit may comprise a reader 96 so that it may determine the material stored in the storage container 18. Identifiers 95 may be located on the container or a cover of the container. Identifiers 95 may include radio frequency identification (RFID) tags, bar codes, QR codes, etc. with reader 96 being an appropriate reading mechanism. Other mechanisms, such as near field communication (NFC) and Bluetooth low energy (BLE) can also be used to provide identification, as well as quantity or other sensed variables via a built-in sensor (not shown). The controller may have the identifiers 95 pre-programmed, or may include a training procedure for input of the identifier 95 along with an association with a particular material. In this manner, recipes can be automatically dispensed from the various storage containers 18 under the control of the base unit.

Figure 10:
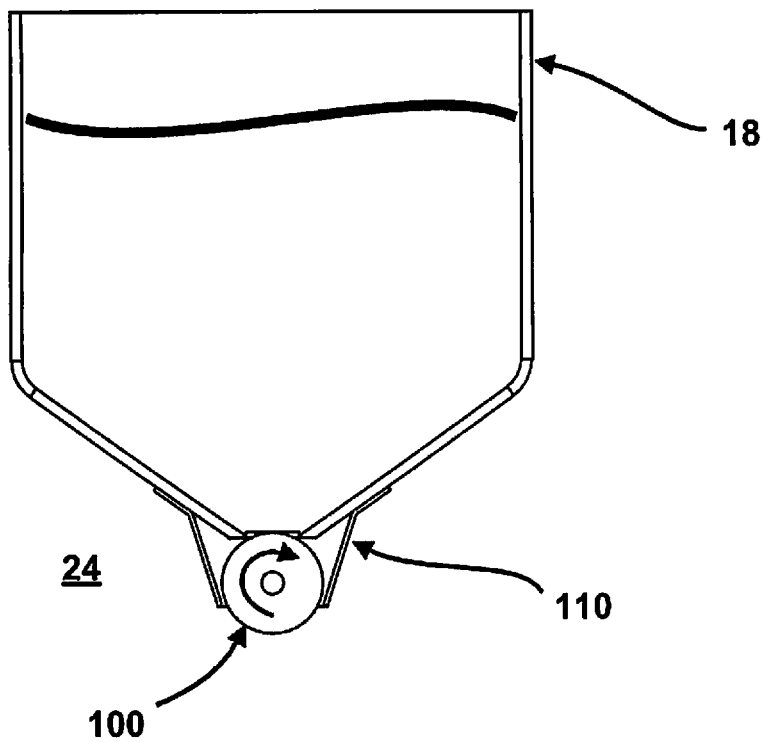
FIG. 10 illustrates a sectional view of an embodiment of a storage compartment with a roller feed dispensing mechanism.

Another embodiment of a dispensing section mechanism 24 included on a storage container 18 is illustrated in FIG. 10. The feed screw of FIG. 8 is replaced with a substantially cylindrical roller or shaft 100 of a roller feed mechanism. Storage compartment 18 is mounted above shaft 100, allowing the stored granular material to be introduced to the top surface of the shaft 100. A motor or other drive unit turns shaft 100 clockwise in the embodiment, which draws the material against metering wall 110 and then ejects the material below based upon gravity. Shaft 100 or metering wall 110 may be moved relative to each other or relative to storage compartment 18 to regulate the flow of material. Additionally, shaft 100 may be moved up against the bottom of storage compartment 18 when not in use, sealing storage compartment 18. While the storage container 18 may take various shapes, it is preferable to have angled walls near the outlet in order to improve gravity flow of the material.

Figure 11:
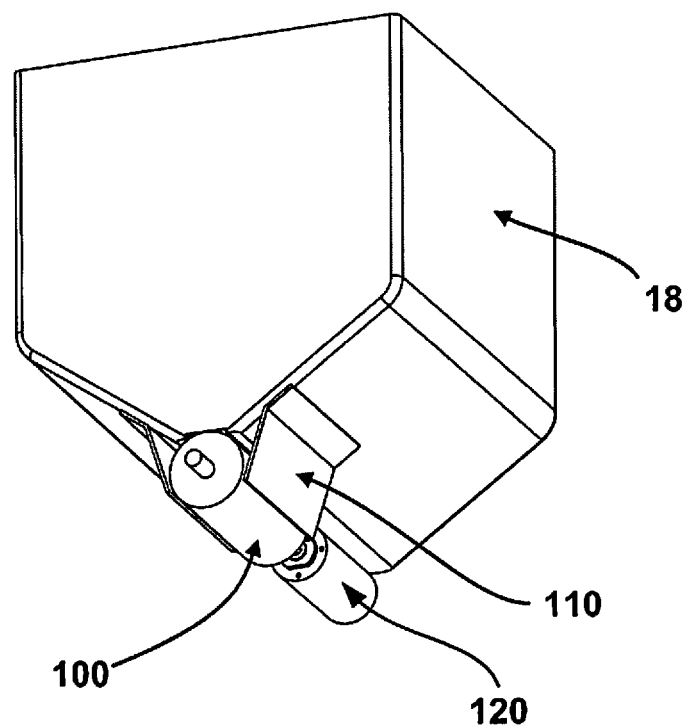
FIG. 11 illustrates a perspective view of an embodiment of a storage compartment with a roller feed dispensing mechanism attached to a motor.

FIG. 11 is a perspective view of the embodiment of FIG. 10. A motor 120 (or other drive unit) may be placed in a convenient position to turn shaft 100. The motor 120 may be part of the storage compartment 18 or part of the base unit. The surface of shaft 100 may be smooth, coated with a soft rubber-like material, or textured to best suit the material being dispensed. For example, the surface of shaft 100 may be knurled metal.

Figure 12:
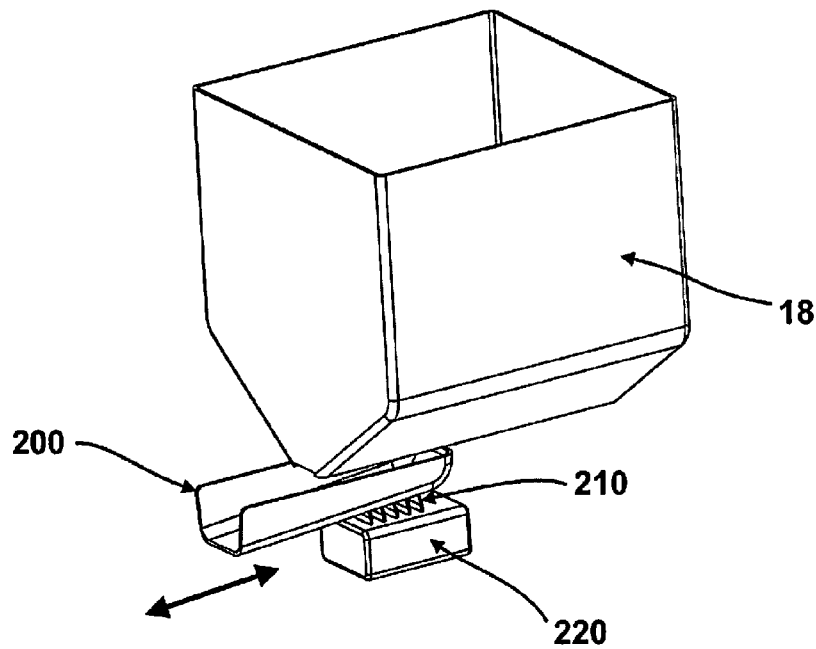
FIG. 12 illustrates a perspective view of an embodiment of a storage compartment with a vibration feed dispensing mechanism.

It is also possible to dispense granular or powder materials using a vibration feed apparatus. An alternative embodiment of the dispensing section mechanism 24 is illustrated in FIG. 12. Storage compartment 18 is mounted above a chute 200 with an outlet (not illustrated) feeding material to the chute 200. Vibrator 220 is attached to chute 200 via flexural elements 210, which transmit or focus the direction of vibratory motion in a desired direction. Thus, chute 200 is energized into vibratory motion as illustrated by the arrows in FIG. 12. The vibratory motion of chute 200 transports and ejects granular material at a precise rate that may be calibrated. It is also possible to vary the flow based on the position of the chute. For example, the position or angle of chute 200 may be adjusted relative to storage compartment 18 in order to adjust the flow rate of material. In this embodiment, the vibratory action may also provide an advantage by agitating and homogenizing the material to reduce blockages or interruptions in flow, such as by breaking clumps or agglomerations.

Figure 13:
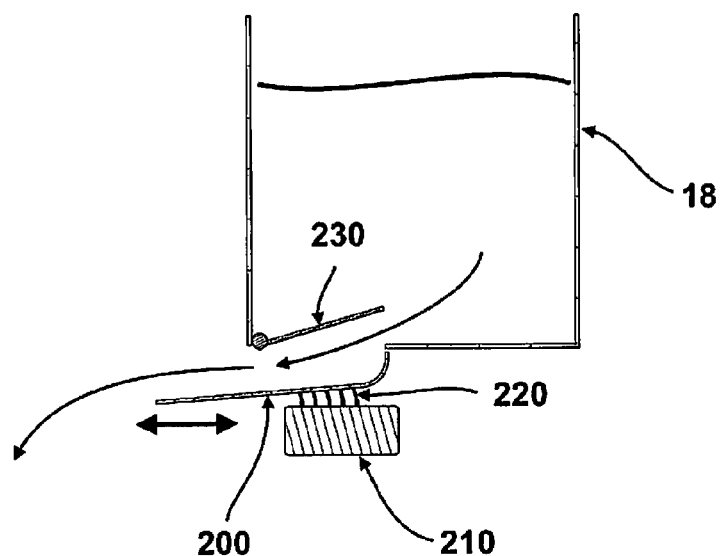
FIG. 13 illustrates a sectional view of an embodiment of a storage compartment with a vibration feed dispensing mechanism.

FIG. 13 illustrates a cross-section of the vibratory feed apparatus in accordance with the embodiment of FIG. 12. In order to seal storage compartment 18 when not in use, a door 230 may be provided which opens when storage compartment 18 is placed upon the dispenser unit or brought into relation with the base unit. Thus material can be introduced by gravity into chute 200 and subsequently transported by the described vibratory motion. While a hinged door 230 is illustrated, this is not meant as a limitation and other means of sealing storage compartment 18 are certainly feasible, such as soft plugs or membranes, sliding doors, or other devices known in the art.

The dispensing section mechanisms 24 described in FIGS. 1-13 are preferably integrated into corresponding storage containers 18 to avoid cross-contamination problems. Moreover, the dispensing section mechanisms 24 described in FIGS. 1-13 should preferably be able to transport significant quantities of material quickly, yet be able to deliver precise amounts of material, typically down to approximately 1 gram (0.125 oz). This may be a conflicting requirement with the precision desired by the dispensing mechanisms described, since they rely upon mechanical transport of material at an assumed or calibrated rate. No means of measuring the material is provided during actual transport, so inconsistency, gaps, or clumps of material may adversely impact delivery accuracy.

In addition, as mentioned above, it is desirable to minimize cross-contamination of ingredients when placing new storage compartments 18 onto the storage dispenser unit. In general, the dispensing section mechanisms of FIGS. 1-13 will retain some material inside the mechanism after dispensing. This material will remain in an un-sealed environment and is subject to spoiling or contamination. Un-dispensed material can leak or drop out the bottom from the dispensing section when the container is stored. Thus, it is preferable to provide some means to evacuate the mechanism of this excess material. A waste compartment (not illustrated) may optionally be provided in the storage dispenser mechanism, where the dispensing section mechanism is run while closed off from storage compartment 18 but open to the waste compartment. Thus excess material may be deposited in the waste compartment. Means, such as vibration or compressed air, may also be provided to increase the efficacy of this cleaning operation. Further, it may also be possible to reverse the dispensing mechanism and feed excess material back into storage container 18.

Alternatively, a dispensing section mechanism may be provided which minimizes leftover waste material while simplifying sealing of storage container 18 by employing a shuttle feed mechanism that moves or "shuttles" precise amounts of material to a dispensing port. This alternate embodiment may effectively address the problem of fast delivery with precise measurement, since an efficient means of measuring the material is provided during transport. However, since the shuttle feed relies upon material volume instead of weight, a first volume of material may be selected based upon an estimated weight of the material, the weight calibrated upon the first amount of shuttle-fed material, and subsequent volumes shuttle-fed to obtain the desired weight of material. Alternately, shuttle-fed amounts may be delivered initially based upon volume, with measured weight being used to adjust the final delivery of material. Further, while a rotary-type shuttle feed apparatus is disclosed herein, embodiments may also employ a linear-type shuttle feed apparatus or other known shuttle feed mechanisms (not shown).

Figure 14:
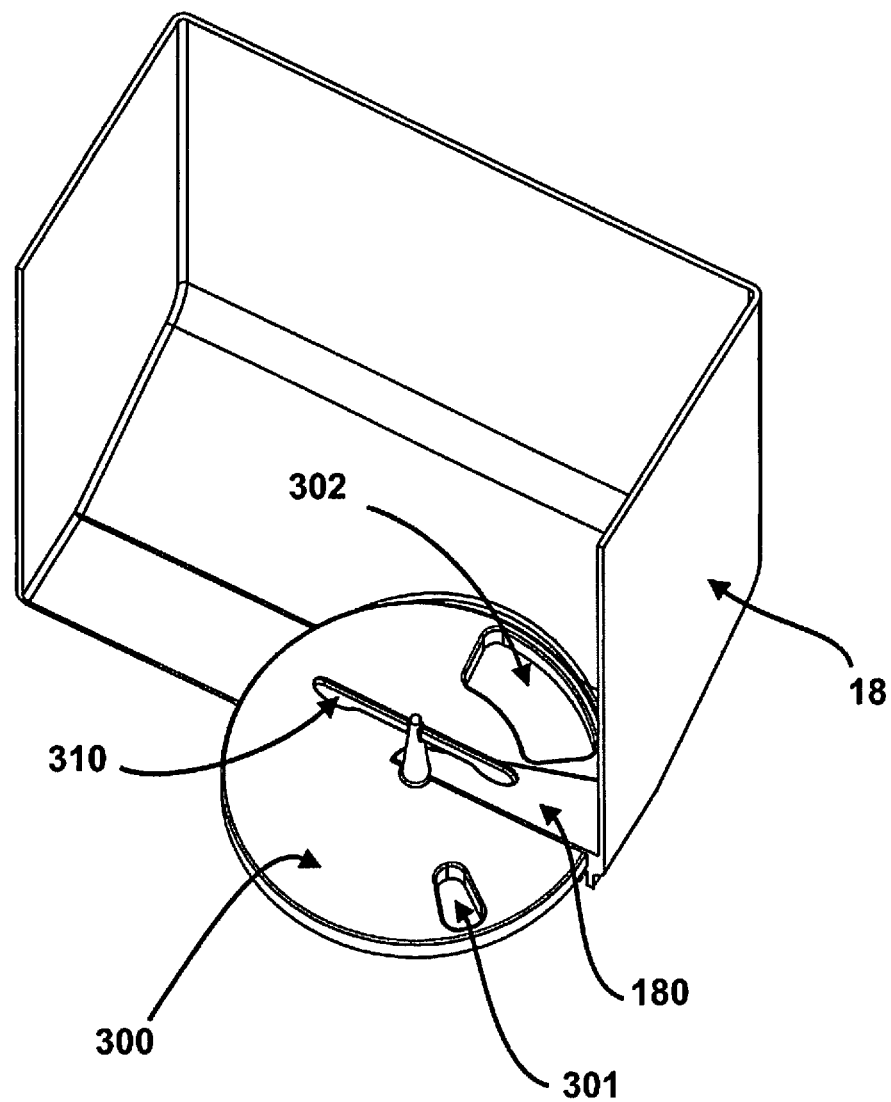
FIG. 14 illustrates a cutaway view of an embodiment of a storage compartment with a rotary shuttle feed dispensing mechanism.
Figure 15:
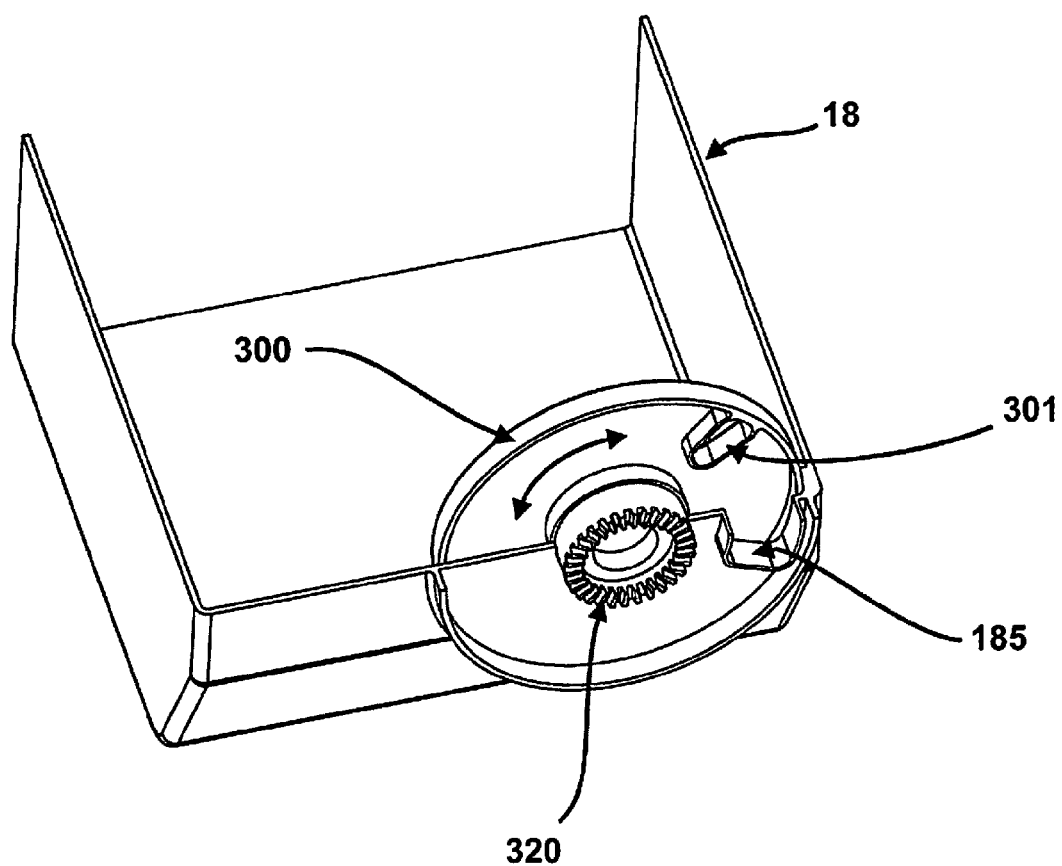
FIG. 15 illustrates a sectional view from below of an embodiment of a storage compartment with a rotary shuttle feed dispensing mechanism of FIG. 14.

Referring to FIG. 14 and FIG. 15, material dispensing is accomplished via a rotary shuttle feed apparatus using a disk 300 mounted in the bottom of storage compartment 18. Disk 300 is rotated via coupler 320 (illustrated as a toothed gear, although not limited thereto), driven by a motor in or associated with the base of the storage dispenser unit. Thus disk 300 and coupler 320 stay with storage container 18. Disk 300 contains two pockets 301 and 302. In the preferred embodiment, pockets 301 and 302 are different sizes. An agitator 310 is attached to disk 300 and rotates with it.

Figure 16:
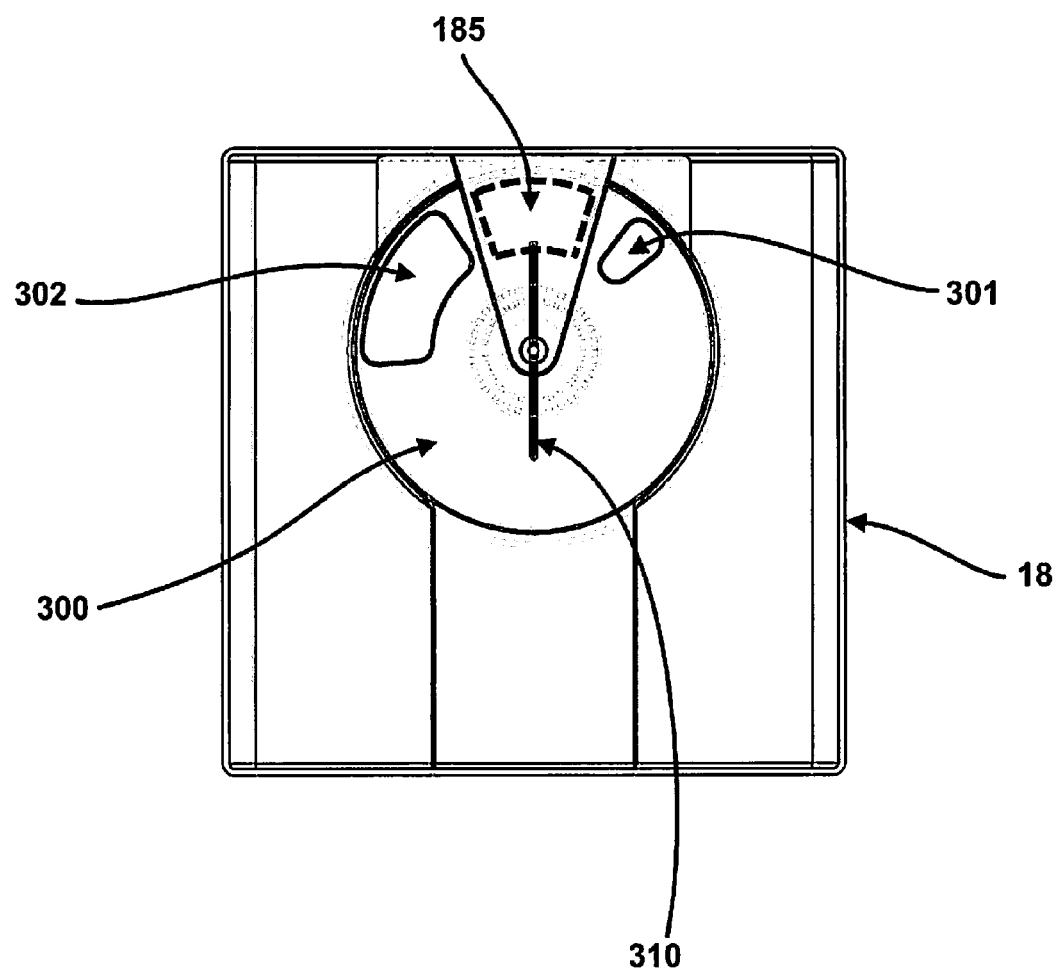
FIG. 16 illustrates a top view of an embodiment of a storage compartment with a rotary shuttle feed dispensing mechanism of FIGS. 14-15.
Figure 17:
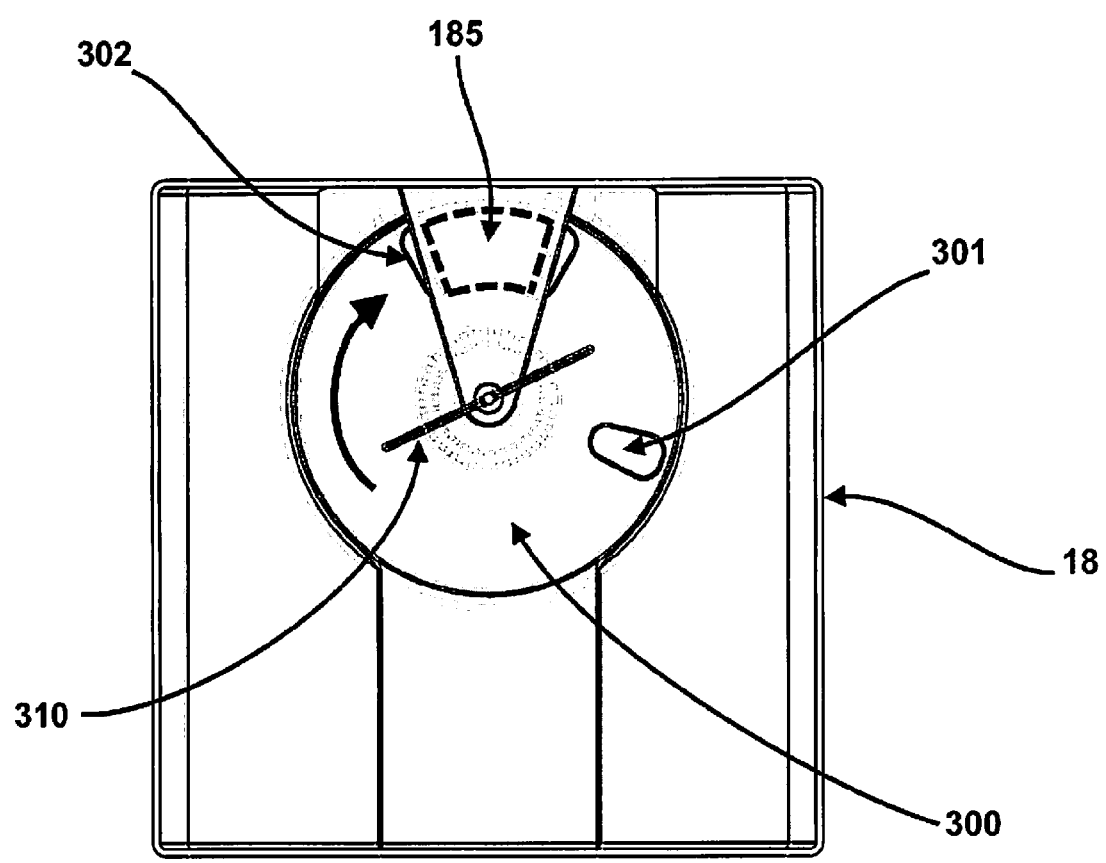
FIG. 17 illustrates a top view of an embodiment of a storage compartment with a rotary shuttle feed dispensing mechanism in accordance with FIGS. 14-16.

Referring to FIG. 15, a dispensing port 185 is provided in the bottom of storage container 18. In the neutral or storage position of disk 300, dispensing port 185 is blocked by not being in registration with any pockets, effectively sealing storage container 18. In this position pockets 301 and 302 are open to the stored granular material, but not open to dispensing port 185. A top view of wheel 300 in the neutral position is shown in FIG. 16. Now referring to FIG. 14, pocket 302 is significantly larger than pocket 301, so a different amount of material fills each pocket while wheel 300 is in the neutral position. If the controller of the storage dispensing device commands a large amount of material, the motor rotates wheel 300 clockwise (viewed from above in FIG. 14) via coupler 320. Wheel 300 will rotate clockwise until pocket 302 aligns with dispensing port 185, allowing the material to be dispensed by gravity. A wall 180 is provided inside storage container 18, which serves to skim off any excess material in pocket 302 and define a specific volume. Thus a consistent approximate amount of material is dispensed each time wheel 300 rotates clockwise to the dispense position. The precise weighing function of the storage dispensing device controller is thus better able to control the dispensing process. FIG. 17 is a top view showing pocket 302 rotated clockwise into alignment with dispensing port 185.

After the material is dispensed by gravity, wheel 300 is rotated back to the neutral position so that pocket 302 may be refilled and re-used if necessary. Note that pocket 301 has remained filled during the entire dispense operation with pocket 302, so it too will be ready for a subsequent dispensing operation.

Figure 18:
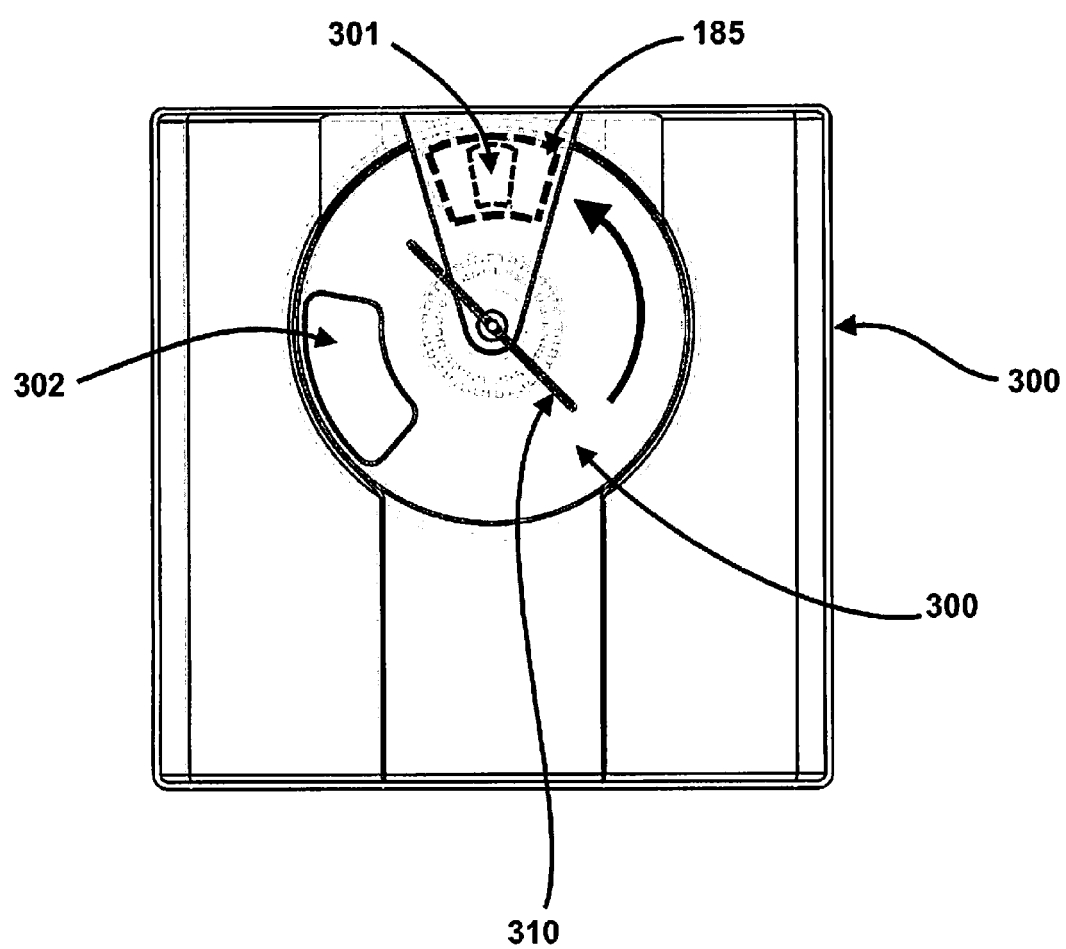
FIG. 18 illustrates a top view of an embodiment of a storage compartment with a rotary shuttle feed dispensing mechanism in accordance with FIGS. 14-17.

When dispensing has progressed to the point where a fine amount of material is required, the storage dispensing device controller will make use of pocket 301 to deliver smaller incremental amounts or "shots" of material. In this case, wheel 300 will be rotated counter-clockwise (viewed from above) until pocket 301 aligns with dispensing port 185 and the material is dispensed via gravity. Again, wall 180 skims off any extra material as pocket 301 passes underneath it, defining a precise volume of material. Using a smaller pocket in this manner allows resolution of much finer measurements of material. FIG. 18 is a top view showing pocket 301 rotated counter-clockwise into alignment with dispensing port 185. Again after dispensing, wheel 300 is rotated back to the neutral position and storage container 18 is sealed, ready for further dispensing.

Figure 19:
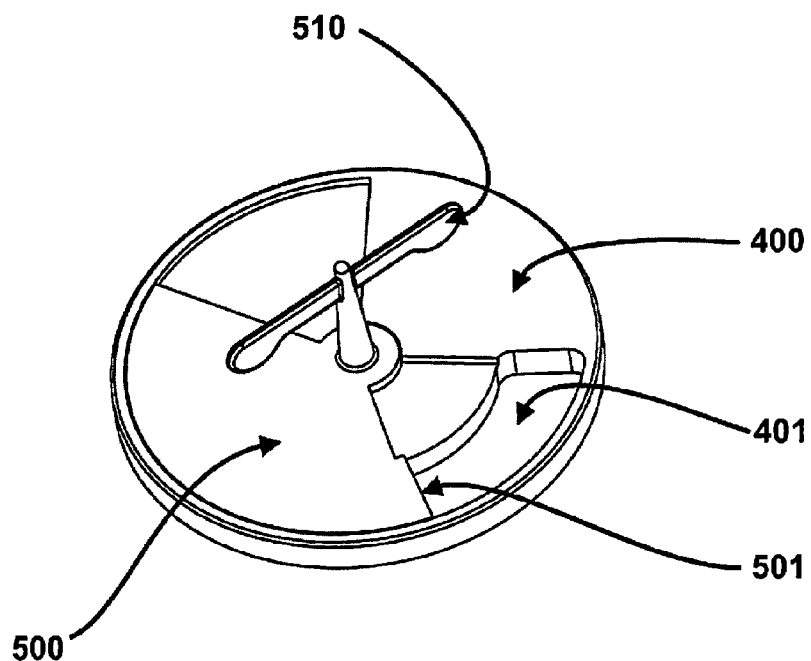
FIG. 19 illustrates a perspective view from above of an embodiment of a rotary shuttle feed dispensing mechanism using multiple disks to form a variable pocket volume.
Figure 20:
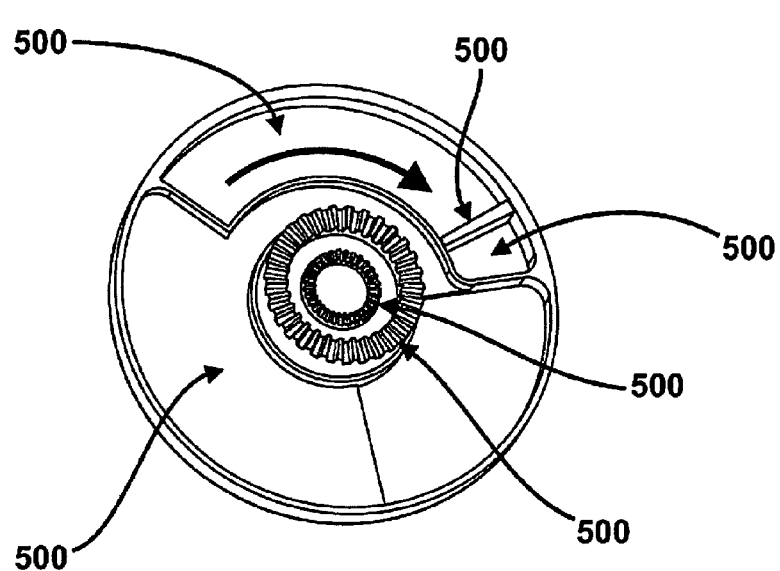
FIG. 20 illustrates a perspective view from below of an embodiment of a rotary shuttle feed dispensing mechanism using multiple disks to form a variable pocket volume.

A further refinement to the embodiment of FIGS. 14-18 replaces multi-cavity disk 300 with a two-piece disk that includes an adjustable volume pocket, as illustrated in FIGS. 19-23. This allows the finest possible control of portion size. FIG. 19 shows outer disk 400 with inner disk 500 mounted within. Material agitator 510 is mounted rigidly to inner disk 500. A wall 501 of inner disk 500 comprises one boundary of the dispensing pocket 401 or outer disk 400. Inner disk 500 can rotate relative to outer disk 400, moving wall 501 and effectively varying the size of dispensing pocket 401. Referring now to FIG. 20, drive coupling 420 rotates disk 400 just as in the previous embodiment of FIGS. 14-18. In this embodiment, a second drive coupling 520 is provided to independently rotate inner disk 500 relative to outer disk 400. In the preferred embodiment, drive couplings 420 and 520 are coaxial, and are driven by separate coaxial stepper motors in or associated with the storage dispensing unit base. Again, other suitable drive configurations can easily be imagined by someone with ordinary skill in the art.

Referring again to FIG. 20, inner disk 500 has been rotated clockwise relative to outer disk 400 (by turning coupling 520 relative to coupling 420). This has the effect of positioning wall 501 closer to the opposing wall of dispensing pocket 401, reducing the size of dispensing pocket 401. This configuration would be appropriate for precision measurements, such as for final dispensing to an accurate weight. Now referring to FIG. 21, inner coupling 520 is rotated counter-clockwise relative to outer coupling 420. This has the effect of moving wall 501 farther away from the opposing wall of dispensing pocket 401, increasing the size of dispensing pocket 401. This configuration would be appropriate for dispensing larger amounts of material at a faster rate.

Figure 21:
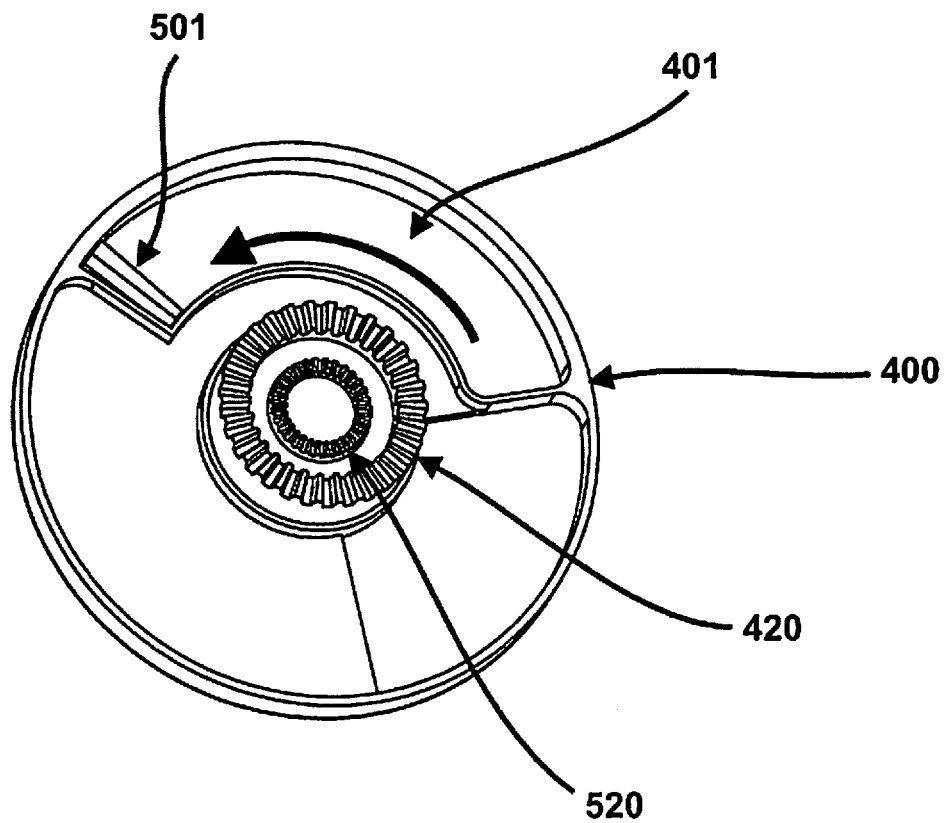
FIG. 21 illustrates another perspective view from below of an embodiment of a rotary shuttle feed dispensing mechanism using multiple disks to form a variable pocket volume.
Figure 22:
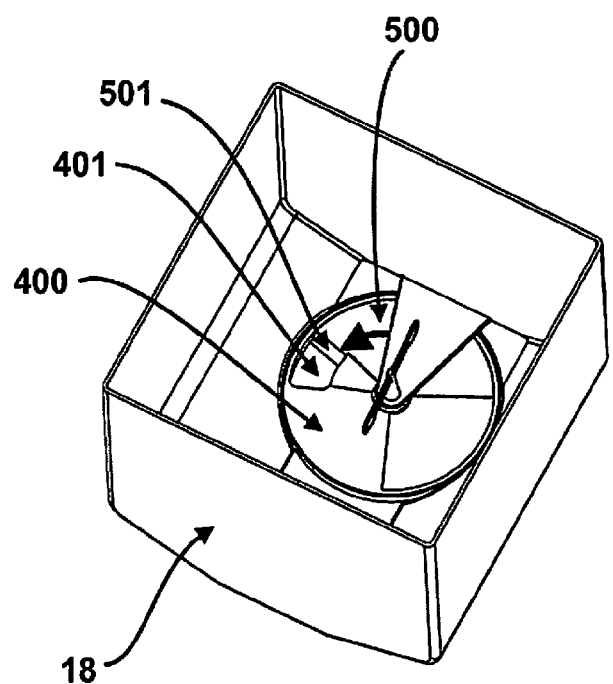
FIG. 22 illustrates a perspective view from above of an embodiment of storage compartment with a rotary shuttle feed dispensing mechanism using multiple disks to form a variable pocket volume.
Figure 23:
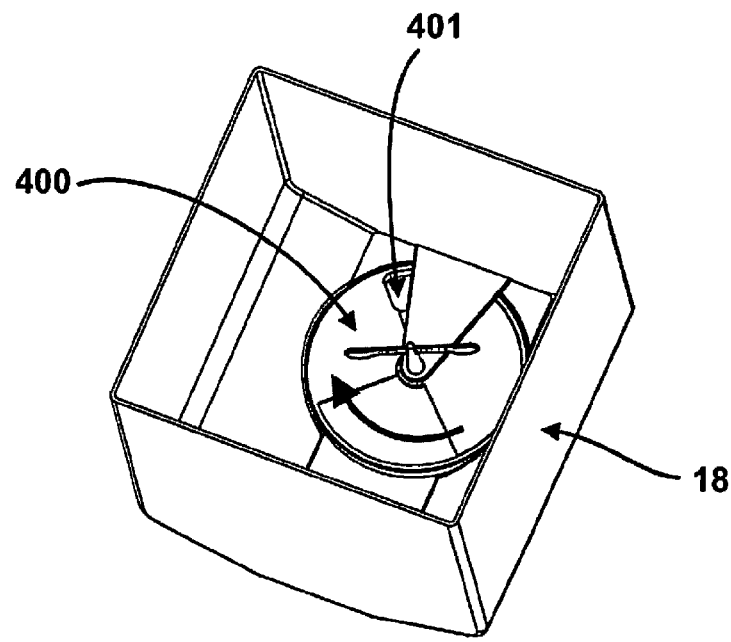
FIG. 23 illustrates another perspective view from above of an embodiment of storage compartment with a rotary shuttle feed dispensing mechanism using multiple disks to form a variable pocket volume.

As in the embodiment of FIGS. 14-18, the disk assembly 400-500 is placed in the bottom of storage container 18 and acts to seal the container while in the neutral position. As all or virtually all of the material will fall by gravity through the dispensing port, little to no excess material will need to be addressed. A layer of non-stick material on walls of the dispensing port may be employed to prevent any material from remaining in the flow path outside of the sealed storage container 18. Referring to FIGS. 20-22, prior to dispensing material, the storage dispensing device controller will calculate the ideal cavity or "shot" size. Inner disk 500 will be rotated relative to outer disk 400, via coupler 520, in order to adjust the size of dispensing pocket 401. Stepper motors may be used, for example, in the base to provide feedback on dispensing pocket size to the controller. Once the proper size has been realized for dispenser pocket 401, the disk assembly 400-500 is rotated together towards the dispensing outlet of storage container, as illustrated in FIG. 23 to deliver a precise amount of material defined by the volume of the dispenser pocket 401 to the dispensing port (not shown) at the lower end of the storage container 18. Thus the desired amount of material (i.e., "shot" size) is delivered. While the largest amount of material dispensed each time in pocket 401 is limited by the size of the disks and container, the smallest size is only limited by the granular nature of the material dispensed, such that 1 gram or less accuracy will typically be achievable.

Figure 24:
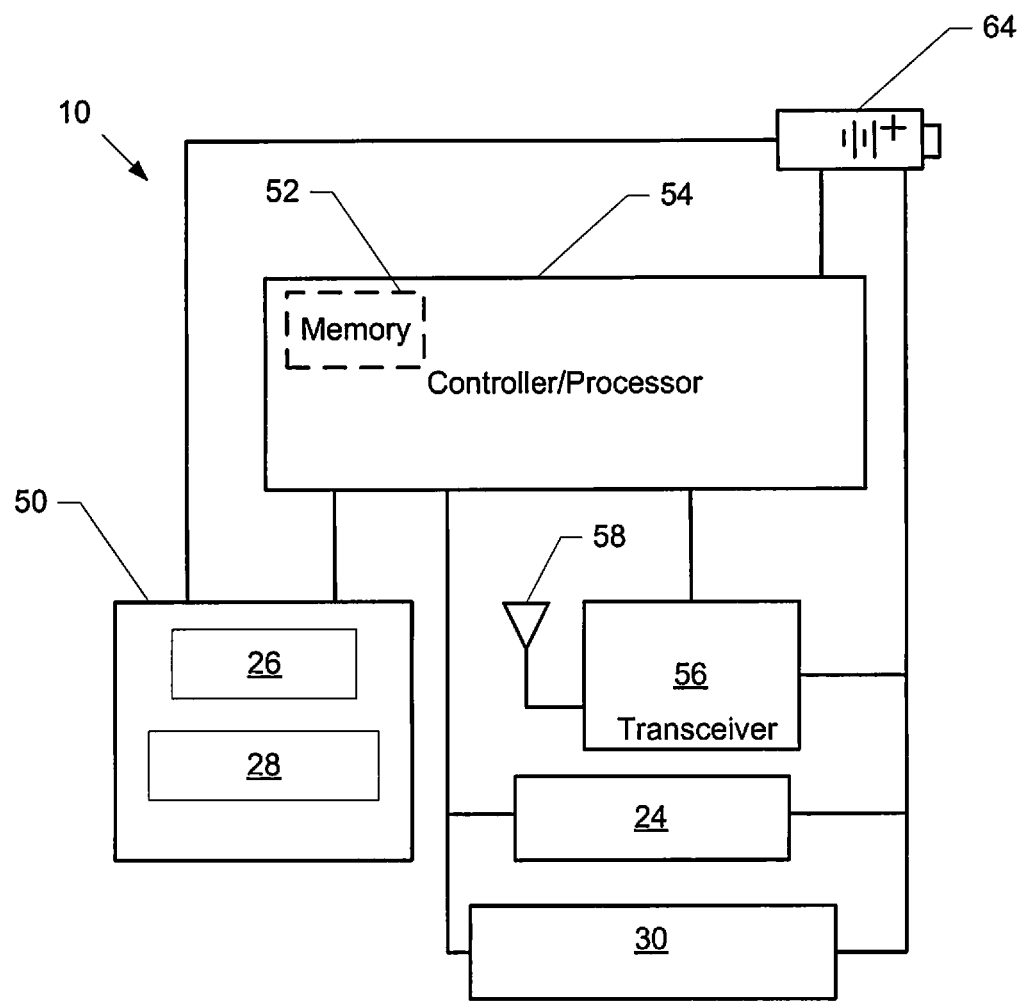
FIG. 24 illustrates an electrical schematic diagram of an embodiment of a dispensing unit.

In an embodiment illustrated in FIG. 24, a precision measurement dispenser unit 10 includes a controller/processor 54 attached to memory 52. The controller/processor 54 receives input from the keyboard 28 and the scale or weighing tray 30, and provides output to display 26 and dispensing unit 24. The unit 10 is also preferably networked for communication with other devices. In an exemplary embodiment, the unit 10 comprises a wireless transceiver 56 that uses an antenna 58 to communicate wirelessly with a network (not illustrated). For example, the transceiver 56 may be a wi-fi transceiver (i.e., 802.11a/b/g/n/ac), a cellular data transceiver (i.e., LTE, WiMax), or a Bluetooth transceiver. The elements of unit 10 receive electrical power from a power source 64, which may be any suitable source, including but not limited to batteries, solar cells, and power supplies that accept AC current from cords.

Memory 52 may comprise volatile memory for execution of processes by the controller/processor 54, as well as non-volatile memory for storage of programs (i.e., processor-executable instructions) and databases. In an embodiment, the memory 52 stores recipes. In another embodiment, processor-executable instructions stored in memory 52 may be configured to control the processor 54 such that recipes may be wirelessly downloaded or updated via a network, such as the Internet, using transceiver 56. In further embodiments, the memory 52 stores at least one program and database for providing or recommending recipe ingredient substitutions, such as for special diets (low-fat, low-calorie, low-cholesterol, low-carbohydrate, low-sugar, sugar-free, gluten-free, non-allergenic, high-protein, high-calorie, vegetarian, vegan, etc.). In yet another embodiment, the memory 52 stores at least one program and database for providing recipe portion controls.

The memory 52 and the controller/processor 54 may also be used to store expiration dates for materials in storage containers 18 so that user may be provided with notice when stored materials have expired or are nearing expiration. The memory 52 and the controller/processor 54 may further be used to control other storage parameters, such as temperature, humidity, and pressure via sensors and control elements (not shown). Similarly, the memory 52 and the controller/processor 54 may also store and execute programs to be used in conjunction with identifiers (e.g., RFID tags) on storage containers to associate the stored material with the correct containers, as well as track material usage and recommend ordering of additional materials.

As discussed above, the various embodiments include precision measurement dispenser devices. In an embodiment, the precision measurement dispenser device may include one or more screw feed augers disposed within the dispensing section of the storage container. A primary auger may advance large amounts of material towards the dispensing port, and a secondary precision auger may rotate at predetermined intervals according to a desired volumetric measurement of material to be dispensed. In some embodiments, the precision measurement dispenser device may include a storage container having two or more separate and segregated compartments. Each compartment may have an associated dispensing section to enable uncontaminated dispensing of materials. The compartments may engage the precision measurement dispenser device base unit individually. In some embodiments, the storage container may include a storage recess for a desiccant or humectant to enable humidity control within the storage container.

The various embodiments may also include methods, and mobile devices configured to implement the methods, of managing material dispensing by a precision measurement device. The methods may include presenting a recipe having one or more instructions on the display of a mobile communications device; transmitting an ingredient identifier and measurement quantity associated with the current instruction from the mobile communication device to the precision measurement dispenser device; receiving, at the precision measurement dispenser device, the ingredient identifier and measurement quantity and looking up a canister identifier associated with the ingredient identifier (i.e., the container in which an ingredient is stored); detecting the canister identifier of the storage container currently engaged with the base unit of the precision measurement dispenser device; comparing the received canister identifier with the detected canister identifier; and if a match exists, dispensing the material within the storage container in the amount specified by the measurement quantity.

In an embodiment, the precision measurement dispenser device may transmit a confirmation to the mobile device and the mobile device may advance the recipe to the next instruction, presenting the next instruction on the display of the mobile communication device. In an embodiment, if the canister identifiers do not match, the precision measurement dispenser device may transmit an error message to the mobile communications device, and the mobile communication device may present a notice to the mobile communication device user via the display. In an embodiment, the method may reiterate until all instructions of the recipe are completed and all materials are dispensed in the specified quantities.

Figure 25:
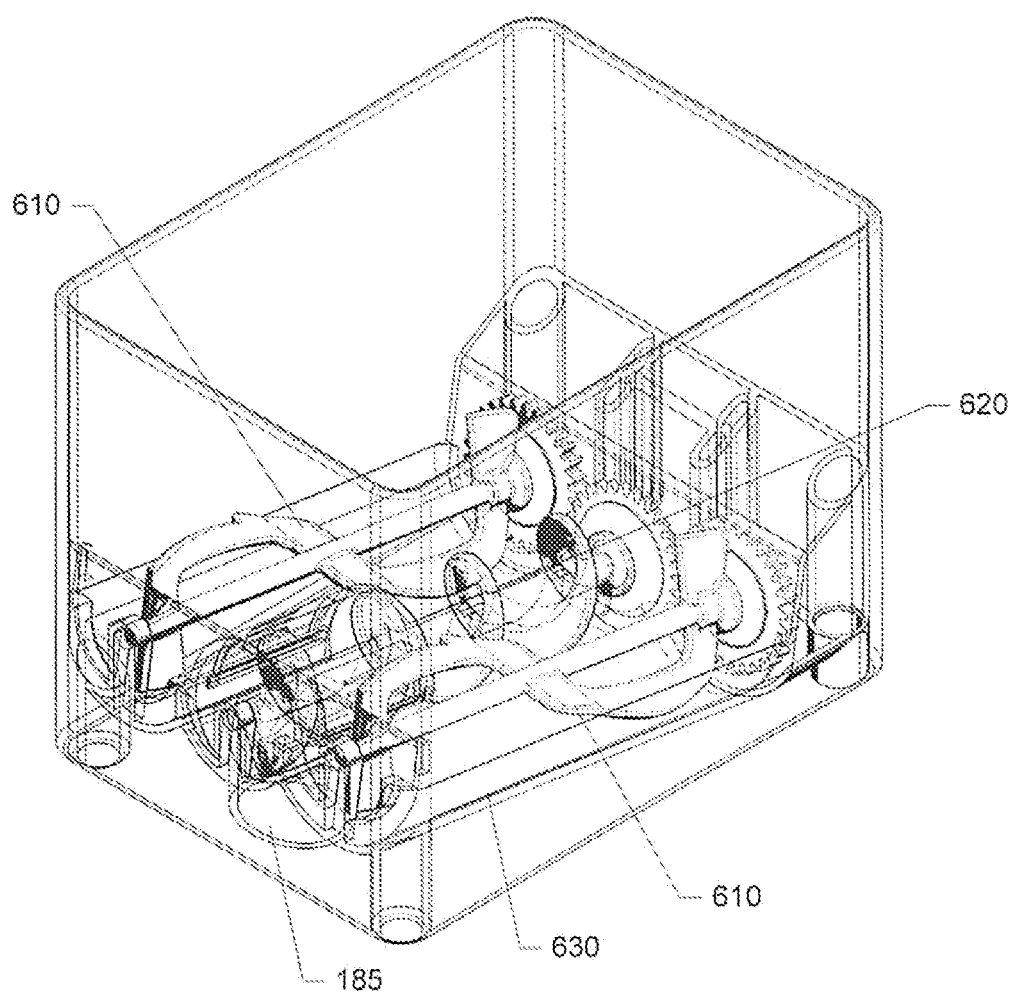
FIG. 25 illustrates a perspective view of a precision measurement dispenser device according to the various embodiments.

With reference to FIG. 25, the dispensing section of the storage container precision measurement dispensing device may include one or more augers 620, and agitators 610. Each of the one or more augers may be in material communication the dispensing ports of the storage container (i.e., disposed directly above or adjacent to the dispensing port). The augers 620 may have a screw shape (e.g. cork screw), helical shape, etc. Material within the storage container may drop down into the auger by force of gravity, and may be pushed forward towards the dispensing port when the auger 620 is active. The auger 620 may be housed within a tubular housing 630, or a semi-tubular housing. The tubular housing 630 may trap material within the radial area of the auger 620, which may force the trapped material forward toward the dispensing port 185. The augers 620 may be operatively connected to the motor and may active in response to electric signals from the controller.

Various embodiments may include one or more agitators 610 disposed near or within the dispensing of the storage container. The agitators 610 may be implemented with various shapes such as screws, helical shapes, rods, etc. Unlike the augers 620, the agitators 610 are not in material communication with the dispensing port 185. When active, agitators 610 may agitate or vibrate material within the storage container, enabling packed material to settle down into the auger 620, where the material may be easily dispensed via dispensing port 185. In this manner, the one or more agitators 610 may reduce the likelihood of material compaction and increase the efficiency of material dispensing. Additionally, the augers may agitate material in a targeted direction such as toward the dispensing port.

Figure 26:
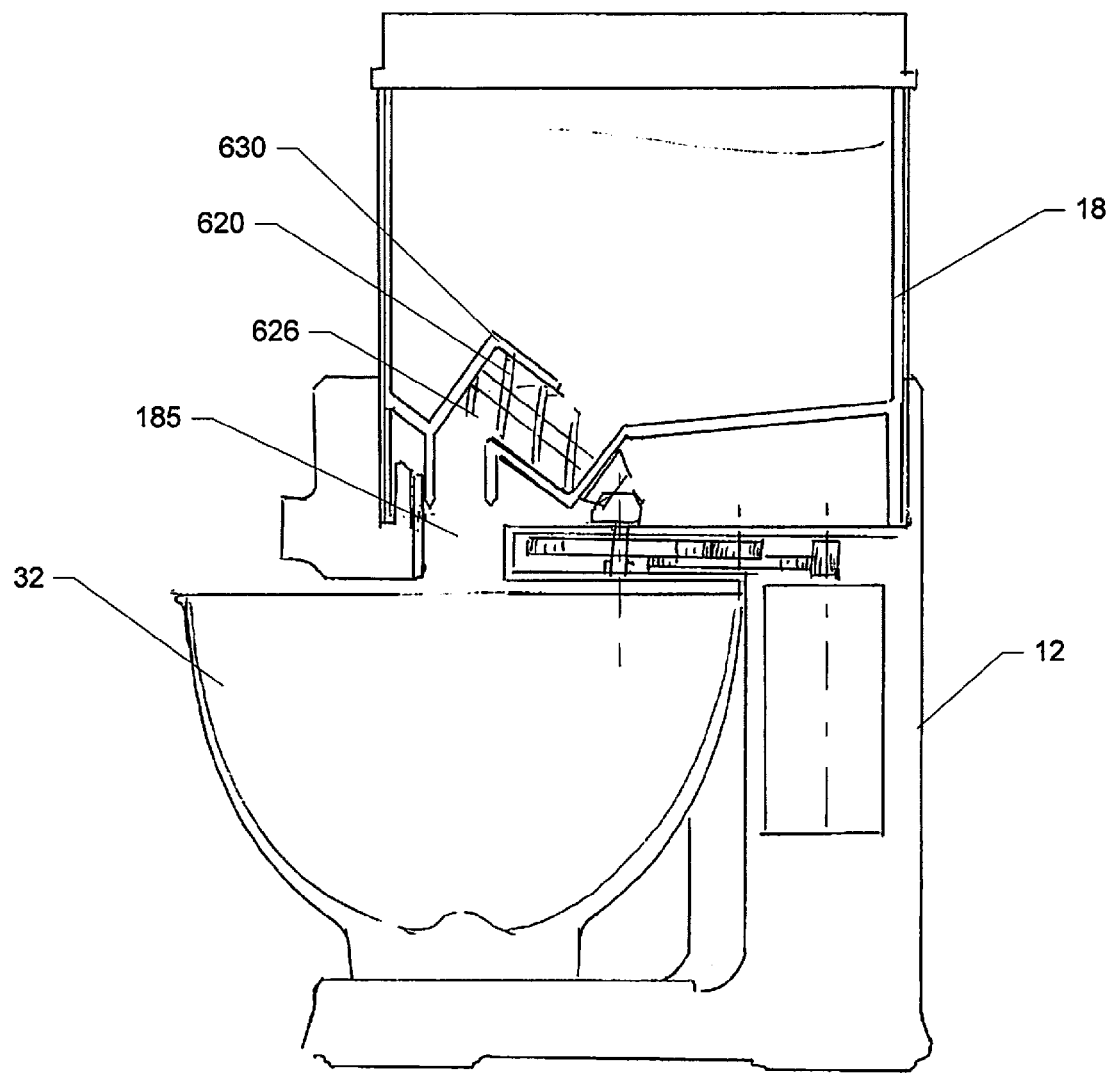
FIG. 26 illustrates a side view of a precision measurement dispenser device according to the various embodiments.

With reference to FIG. 26, a precision measurement dispenser device is shown with the storage container 18 coupled to the base unit 12 with a vessel 32 placed on the base unit 12 in preparation for material dispensing. The dispensing section may include a tubular housing 630 enclosing or partially enclosing an auger 620, and may terminate at the dispensing port 185. As illustrated, the dispensing section may include an auger 620 positioned at an upward angle with respect to the bottom of the storage container 18. Such configurations may reduce the extraneous dispensation of material from within the storage container 18 (i.e., material that is not actively pushed into the dispensing port 185 by the auger 620 will settle back down the tubular housing 630). The terminating end 626 of the auger 620 may be disposed above the dispensing port 185, or may extend only to the end of the tubular housing 630. Material forced forward by the auger 620 may fall out of the dispensing port 185, or onto a chute (as discussed above), and may be captured by a vessel 32. In some embodiments, the auger 620 may be disposed at a downward angle, or may be horizontal with respect to the bottom of the storage container 18.

Figure 27:
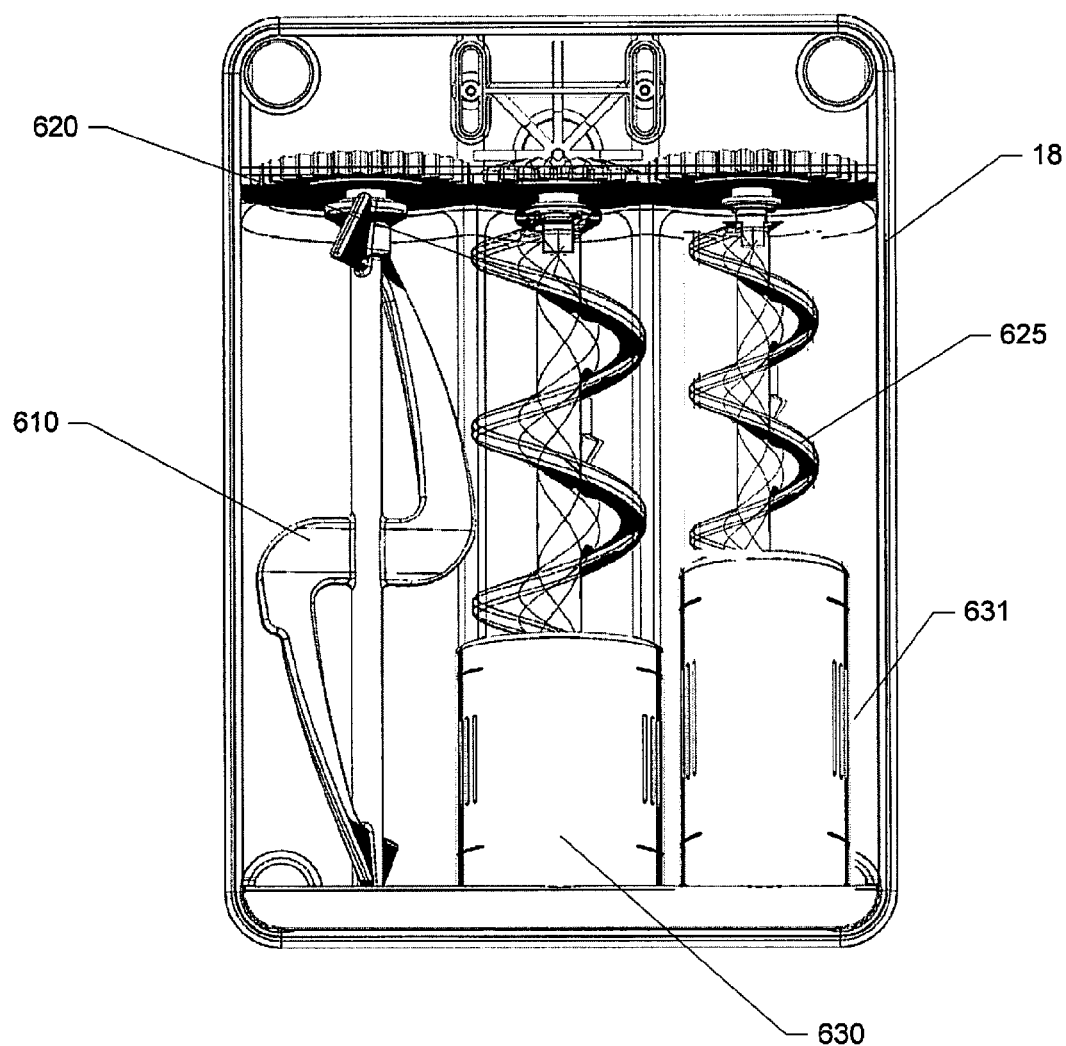
FIG. 27 illustrates an overhead view of a storage container of a modular mixing device according to the various embodiments.

With reference to FIG. 27, a precision measurement dispenser device is shown with multiple augers 620, 625 and an agitator 610. The dispensing section of the storage container 18 may include a primary auger 620 and one or more precision augers 625. The primary auger 620 may have a larger radius than the precision auger 625 and may similarly be larger in size than the precision auger 625. When sizable quantities of material are requested, the primary auger 620 may activate, pushing large amounts of material toward the dispensing port. As the dispensing nears completion, the primary auger 620 may deactivate and the precision auger 625 may begin rotating. The smaller size and radius of the precision auger 625 may result in dispensing of smaller, more accurate amounts of material. To this end, the precision auger 625 may be housed or semi-housed within a tubular housing 631 of smaller radius than that of the primary auger tubular housing 630, thereby trapping smaller amounts of material than the tubular housing 630 of the primary auger 620.

In some embodiments, the precision auger 625 may be configured such that specific rotation of the precision auger 625 correlates to a volumetric measurement. The processor may determine an amount to be dispensed and may instruct the controller to rotate the precision auger 625 a measure of rotation associated with the determined measurement quantity. For example, a 90 degree rotation of the precision auger 625 may correspond to a tablespoon of material being dispensed. The formula and algorithms for correlating the auger rotation to specific measurements of material may vary according to the type of material being dispensed.

In some embodiments, the agitator 610, primary auger 620, and precision auger 625 may lie in parallel, as illustrated in FIG. 27. In other embodiments, the augers 620, 625 and agitator 610 may be staggered, offset, stacked, or otherwise arranged according to the properties of the intended material for dispensing. Any or all of the augers 620, 625 and agitator 610 may be angled or horizontal with respect to the bottom of the storage container 18.

Figure 28A:
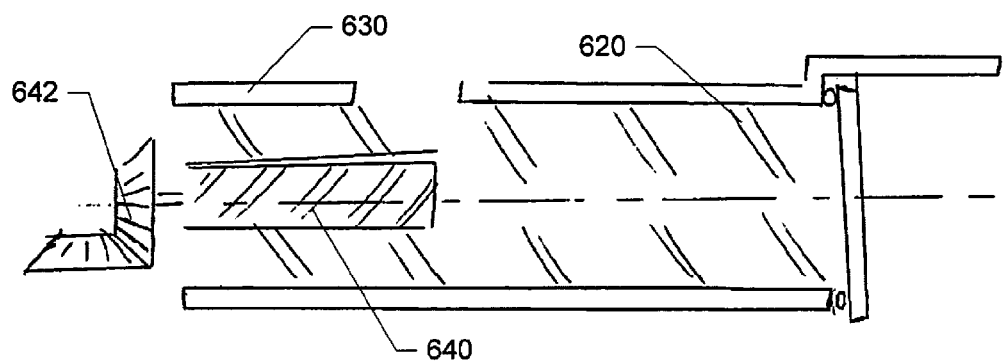
FIGS. 28A-C illustrate side views of an exemplary delivery auger of a precision measurement dispenser device according to the various embodiments.
Figure 28B:
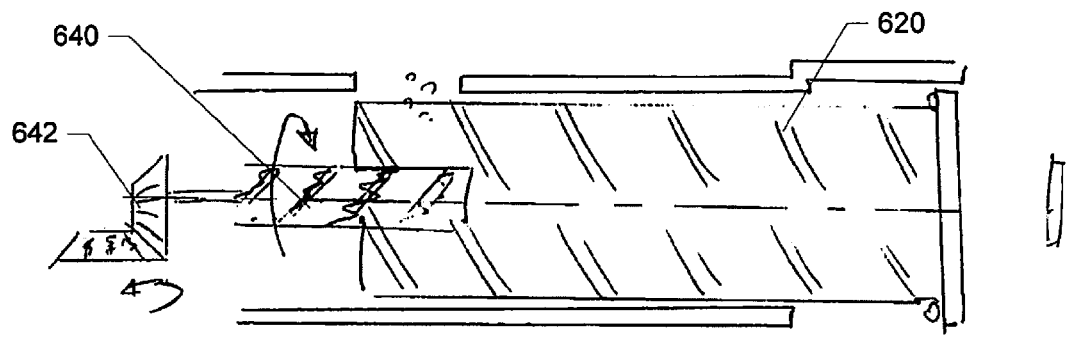
Figure 28C:
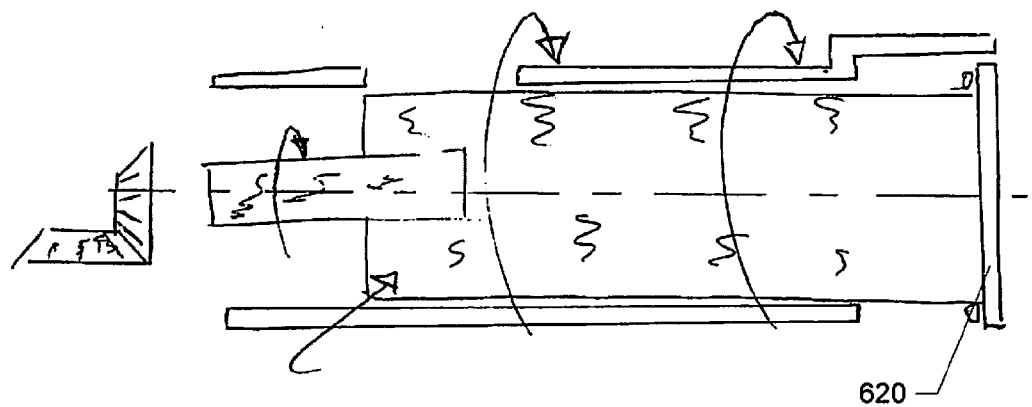

With reference to FIGS. 28A-C, the auger 620 of the precision measurement dispenser device is shown while in motion. In FIG. 28A, the auger 620 is shown in an inactive position, retracted within the tubular housing 630. In an exemplary embodiment, an inner screw 640 may couple the auger 620 to a rotating mechanism 642. The tubular housing 630 may have one or more openings at opposing ends to permit entry and exit of material within the storage container. While the auger 620 is inactive, gravity may force material downward through one of the openings and between threads of the auger 620. The threading may act as a barrier to prevent material from travelling forward until the auger 620 is activated. A uniform lip or cover may be disposed at the far end of the auger 620 to seal the tubular housing 630 and prevent material from exiting through the dispensing port 185.

When the controller activates the auger 620, a driveshaft may engage and move the rotation mechanism 642, which may in turn the inner screw 640, as shown in FIG. 28B. The rotation of the inner screw 640 may engage the auger 620 thereby beginning auger rotation. While rotating, the auger 620 may move forward, moving the auger cover forward and exposing space between auger threading to one or more openings at the end of the tubular housing 630. As shown in FIG. 28C, material trapped between the threads of the auger and within the tubular housing 630 may be pushed forward by rotation of the auger threads. This material may exit the tubular housing 630 upon exposure to an opening in the housing wall. One or more openings may be positioned above the dispensing port such that material exiting the tubular housing may fall through the dispensing port and into a waiting vessel.

Figure 29:
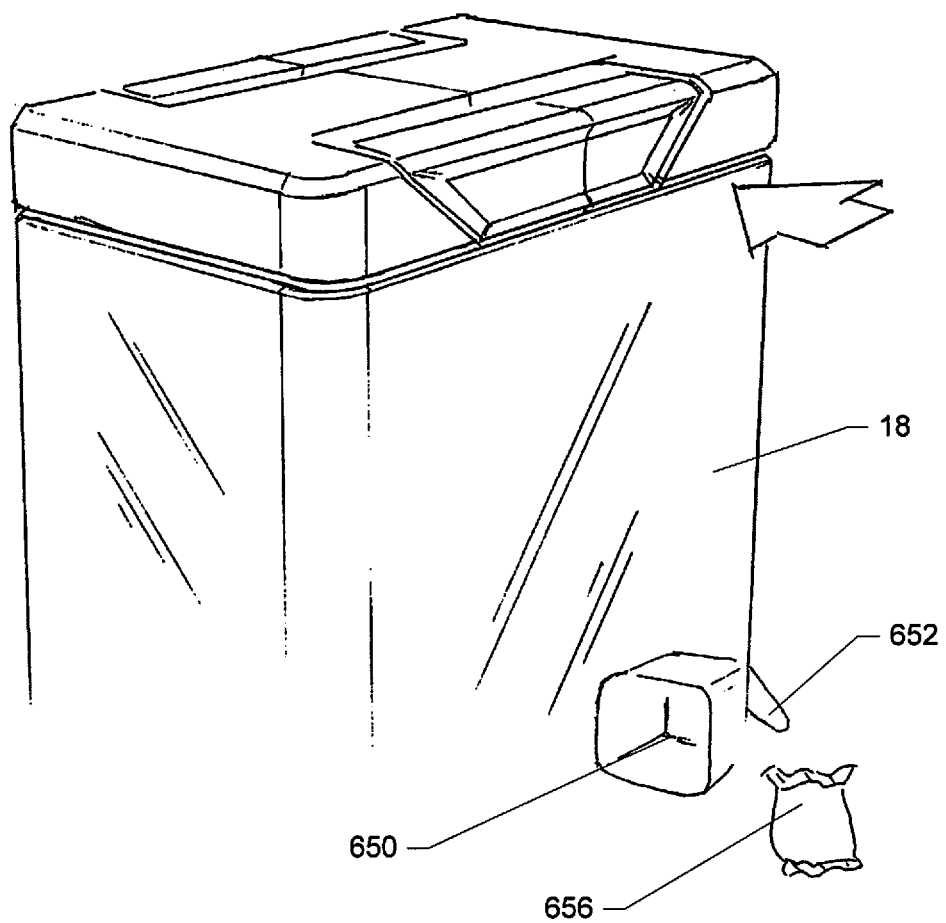
FIG. 29 illustrates a perspective view of a precision measurement dispenser device according to various embodiments including a desiccant storage recess.

With reference to FIG. 29, the storage container 18 of the precision measurement dispenser device may have one or more storage recesses 650 within the storage container wall. A flap, door, or other cover 652 may open within the storage container or along the storage container exterior, providing access to the storage compartment 650 interior. In some embodiments, desiccants or humectants may be stored within the storage recess 650 to control humidity within the storage container 18. In some embodiments, a portion of the storage recess interior to the storage container 18, may have perforations, apertures, or a mesh portion to enable airflow between the storage container contents and the desiccant or humectants. In some embodiments, the desiccant or humectants may be contained within a pouch 656 having a porous made of a porous material. Humidity control may be preferable in storage containers containing ingredients such as brown sugar, flour, corn meal, or other moisture sensitive materials.

Figure 30:
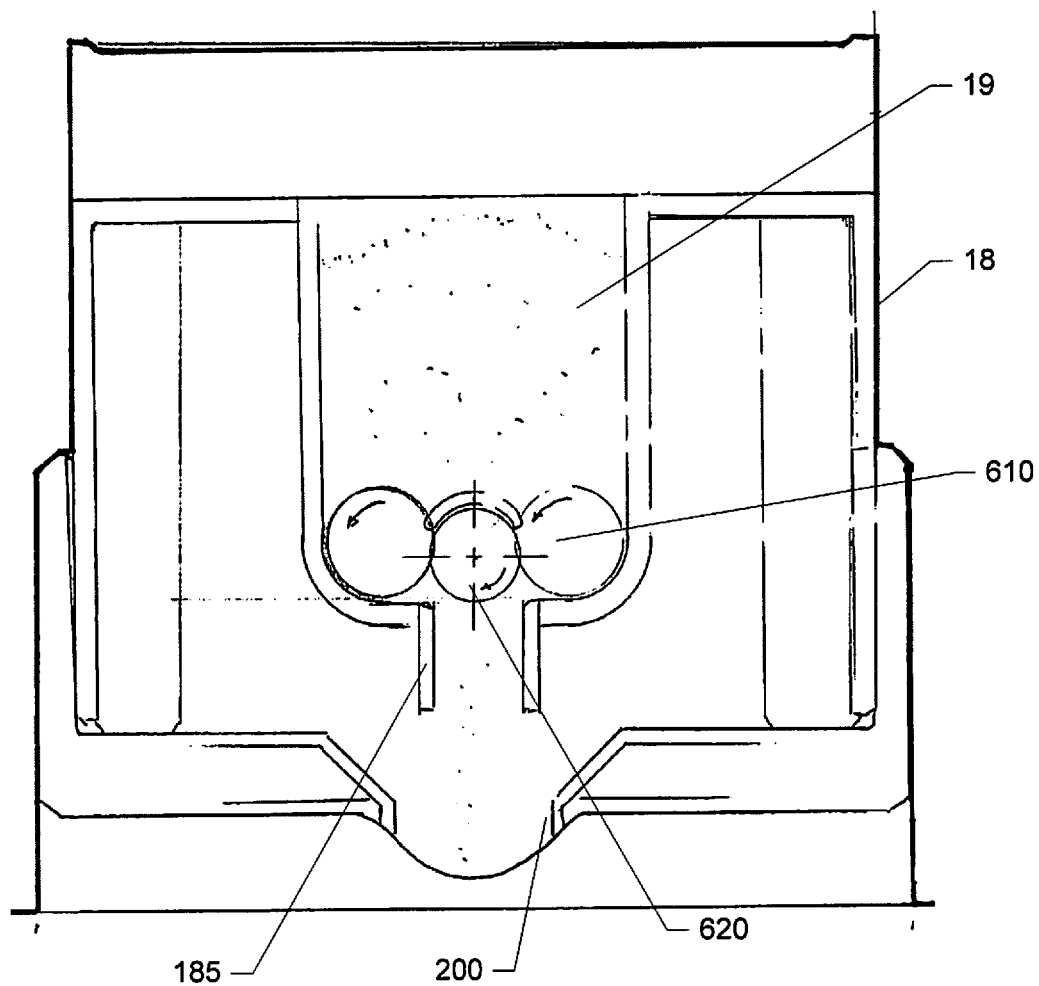
FIG. 30 illustrates a frontal view of a precision measurement dispenser device according to various embodiments including a dual-chamber canister.

With reference to FIG. 30, the precision measurement dispenser device may include storage containers 18 having an interior storage container 19. Like the full size storage container 18, the smaller storage container 19 may have an agitator 610, auger 620, and dispensing port 185. However, the exterior walls of the interior storage container 19 may lie within the exterior walls of the storage container 18, thereby leaving an empty volume within the storage container 18. The dispensing port 185 may align with a chute 200 to enable dispensing of items contained within the interior storage container 19. Such configurations may be advantageous for storage and dispensing of infrequently used or expensive materials. In some embodiments, the outer wall of the storage container may have the same dimensions as a full size storage container and may fit within the base unit. In this way, storage containers 18 having varying interior volumes may be interchangeably used with the base unit.

Figure 31:
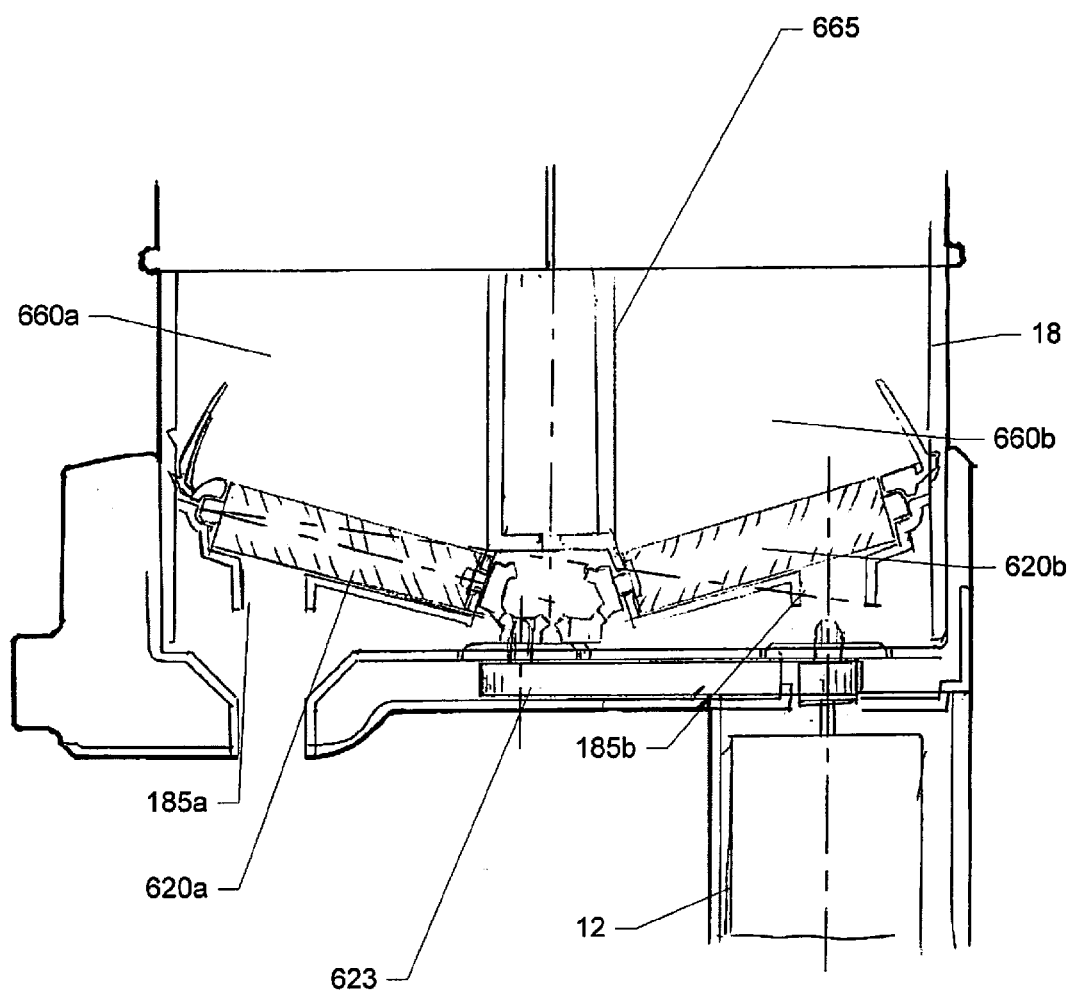
FIG. 31 illustrates a side view of a precision measurement dispenser device according to various embodiments including a dual-chamber canister.
Figure 32:
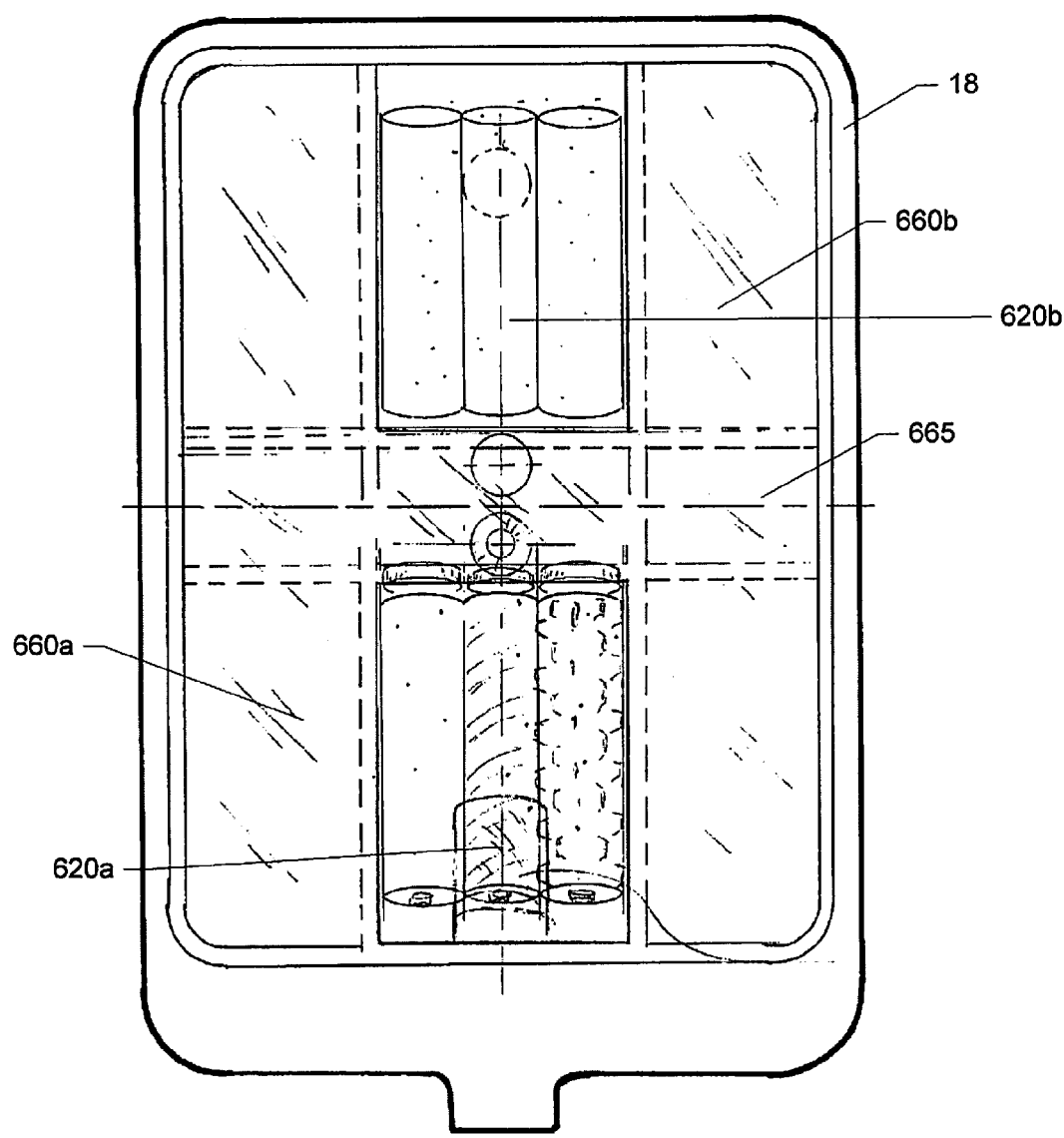
FIG. 32 illustrates an overhead view of a precision measurement dispenser device according to various embodiments including a dual-chamber canister.

With reference to FIGS. 31 and 32, the precision measurement dispensing device may have a storage container 18 having multiple separate chambers 660a, 660b. Multi-chambered storage containers 18 may have a first chamber 660a and a second chamber 660b separated by one or more walls 665. The chambers 660a, 660b may be fully separate and segregated to prevent cross-contamination of materials contained therein. Each chamber 660a, 660b may have a dedicated dispensing section including an auger 620a, 620b, and dispensing port 185a, 185b. In some embodiments, each chamber 660a, 660b may have one or more dedicated augers 610a, 610b. Thus, each chamber 660a, 660b may agitate and dispense materials independent of the other chamber.

In various embodiments, the multi-chambered storage unit may be configured to engage only a single chamber 660a, 660b with the base unit 12. The storage container 18 itself may removable couple to the base unit 12, however only one of the chamber 660a, 660b may be in operatively connected. For example, as illustrated in FIG. 31, a forward chamber 660a may be aligned with the chute such that material exiting the dispensing port may drop down through the chute. An auger 620a of the front chamber 660a may be operatively connected to the motor via a coupling mechanism 623 to the base unit 12, but the rear chamber 660b may remain disconnected or inactive. In such embodiments, the storage container 18 may be removed, rotated and replaced to enable dispensing of the material contained in the rear chamber 660b when the auger 620b engages and is mechanically coupled to coupling mechanism 623. In some embodiments the storage container 18 may be rotatably connected to the base unit 12. Rotatable connection may enable the chambers of the storage container 18 to be rotated in and out of engaged position without disconnecting the storage container 18.

Figure 33:
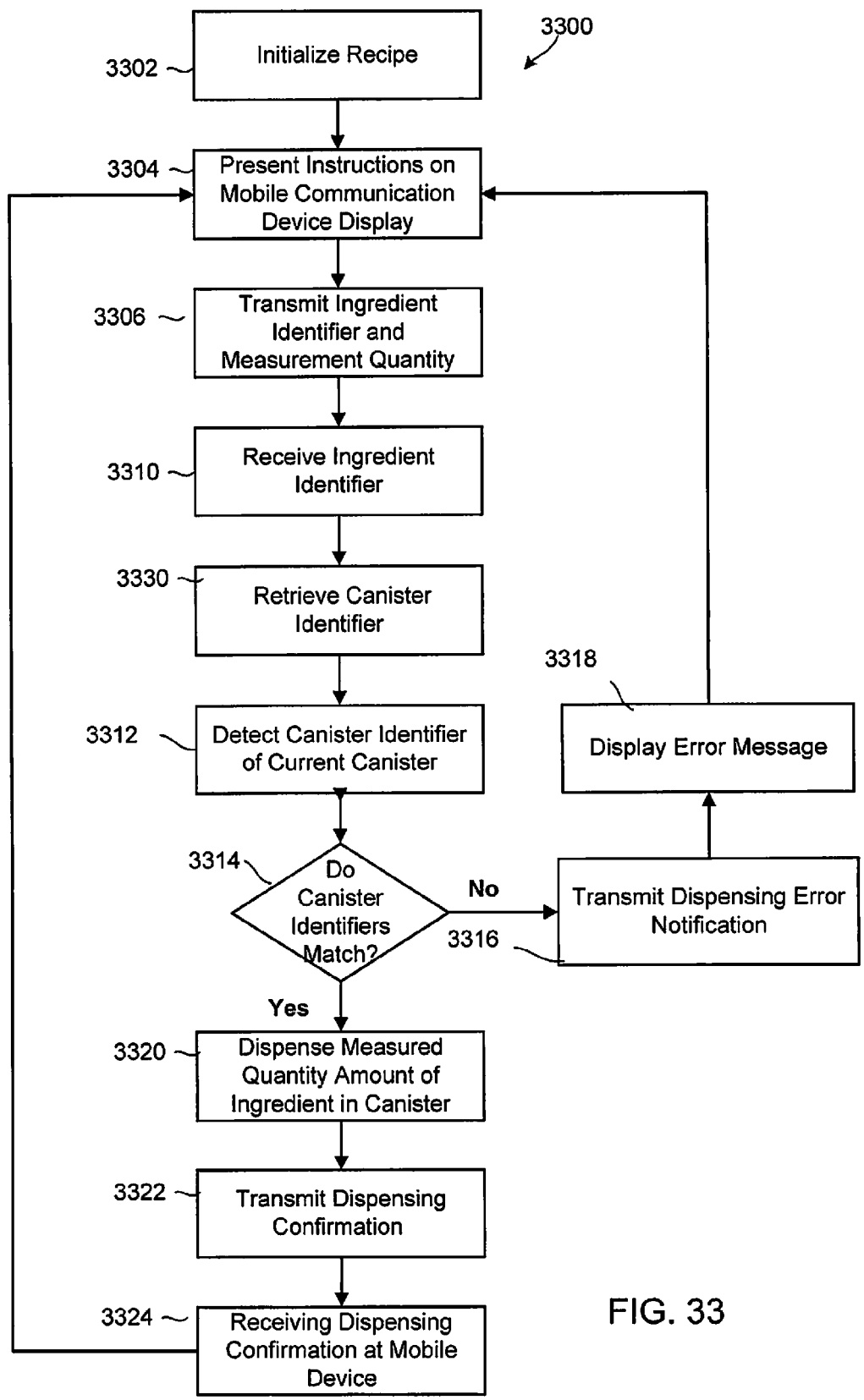
FIG. 33 illustrates a processor flow diagram of an embodiment method for dispensing measured quantities of multiple ingredients via a precision measurement dispenser device.

With reference to FIG. 33, a method for remote management of dispensing ingredients via a precision measurement dispenser device. In block 3302, a mobile communication device may initialize a recipe. The recipe may be locally stored, received via a network, or received from another wireless device. The recipe may be selected by a user or selected automatically by an application running on the mobile communication device. A recipe may comprise a set of ordered or unordered list of instructions relating to a measured quantity of ingredient required for completion of the recipe. In some embodiments, a user may scale the recipe instructions up or down to increase or decrease batch size. For example, a user employing the precision measurement dispenser device to dispense the granular ingredients needed for five dozen cupcakes when the recipe is for one dozen cupcakes, may interact with the user interface of the precision measurement dispenser device or a mobile communication device application to increase a recipe for one dozen cupcakes to the desired five dozen. The precision measurement dispenser device may increase the amount of each ingredient dispensed accordingly. Similarly, if the user desires to dispense the granular ingredients needed for a half dozen cupcakes when the recipe is for one dozen cupcakes, the user may interact with the user interface of the precision measurement dispenser device or a mobile communication device application to decrease a recipe for one dozen cupcakes to the desired half dozen. The precision measurement dispenser device may decrease the amount of each ingredient dispensed accordingly.

In block 3304, the mobile communication device may present one or more instructions (e.g., steps) of the recipe to a user via a display of the mobile communication device. For example, the first step of a recipe or the first ingredient to be dispensed may be displayed on a screen of the mobile communication device.

In block 3306 the mobile communication device may transmit an ingredient identifier and measurement quantity associated with the first displayed instruction to a precision measurement dispensing device. The ingredient identifier may provide information about the specific ingredient to be dispensed by the precision measurement dispenser device. An ingredient identifier may be a code, near field communication tag (NFIC), radio frequency identification (RFID) tags, a bar code, QR code, name of an ingredient, or any other identification means. The measurement quantity may indicate the amount in volumetric units or weight, of the ingredient to be dispensed, in accordance with the recipe.

In block 3310, the precision measurement dispenser device may receive the ingredient identifier and measure quantity. In block 3330 the processor of the precision measurement dispenser device may use the ingredient identifier to retrieve a canister identifier from local storage. The canister identifiers may be stored in a lookup table in a local memory. When a storage container is refilled, or filled with a new ingredient, the user may input, via an input means such as the keyboard, touchscreen display, or microphone configured to accept voice commands, of the base unit, the contents of the storage container. This information may be stored in the local memory as an ingredient identifier and an associated canister identifier. The canister identifier may be an identifier unique to each storage container. Thus, by reading the canister identifier, the base unit may associate a particular ingredient with the storage container.

In block 3312, the base unit may detect the canister identifier of a storage container currently coupled to the base unit of the precision measurement dispenser device. As discussed above, the canister identifier may be read off the canister by a reader of the base unit (e.g., NFIC sensor, RFID sensor, a QR code, barcode, contact reader, Bluetooth connection, etc.). In block 3314, the precision measurement dispenser device may determine whether the canister identifier of the currently connected storage container matches the retrieved canister identifier (e.g., the identifier associated with the received ingredient identifier).

If the canister identifier of the current storage container does not match the canister identifier associated with the received ingredient identifier (i.e., block 3314 evaluates to "No") then the precision measurement device may transmit an error message to the mobile communication device in block 3316. In block 3318, the mobile communication device may present an error message via the display, indicating that the storage container currently in use does not contain the ingredient associated with a displayed instruction. In some embodiments, an onscreen button may be displayed or other input solicited to indicate that a user has swapped out storage containers to the one containing the indicated ingredient. Once the input is received the method may continue at block 3304.

If the canister identifiers match (i.e., block 3320 evaluates to "yes"), then the precision measurement dispenser device may activate a dispensing means and may dispense an amount of the ingredient equal to the measurement quantity. At the completion of dispensing, the precision measurement dispenser device may transmit a dispensing confirmation to the mobile communication device in block 3322. The dispensing confirmation may be a message indicating that the requested ingredient has been successfully dispensed, and the recipe may advance.

In block 3324, the mobile communication device may receive the dispensing confirmation and may advance the recipe to the next instruction. In some embodiments the displayed instruction may be updated in block 3304. In this manner, the mobile communications device may continue managing dispensing of ingredients until all instructions of the recipe are completed. In some embodiments, a user may manually switch out storage containers, connecting storage containers filled with a displayed ingredient, as directed by the mobile communications device.

After each ingredient is dispensed by the precision measurement dispenser device, the processor may initiate a tare of the weight tray. Because the volume, mass, and weight of ingredients within the vessel may increase during the recipe completion process, accurate scale output may depend on recalibrating the weight tray between dispensing sessions to account for the added material. In some embodiments, the processor may automatically initiate the scale tare at the end of a dispensing session. In other embodiments, the user may provide input such as pressing a button or selecting an option on a touchscreen of the base unit, to begin the weight tray recalibration.

Figure 34:
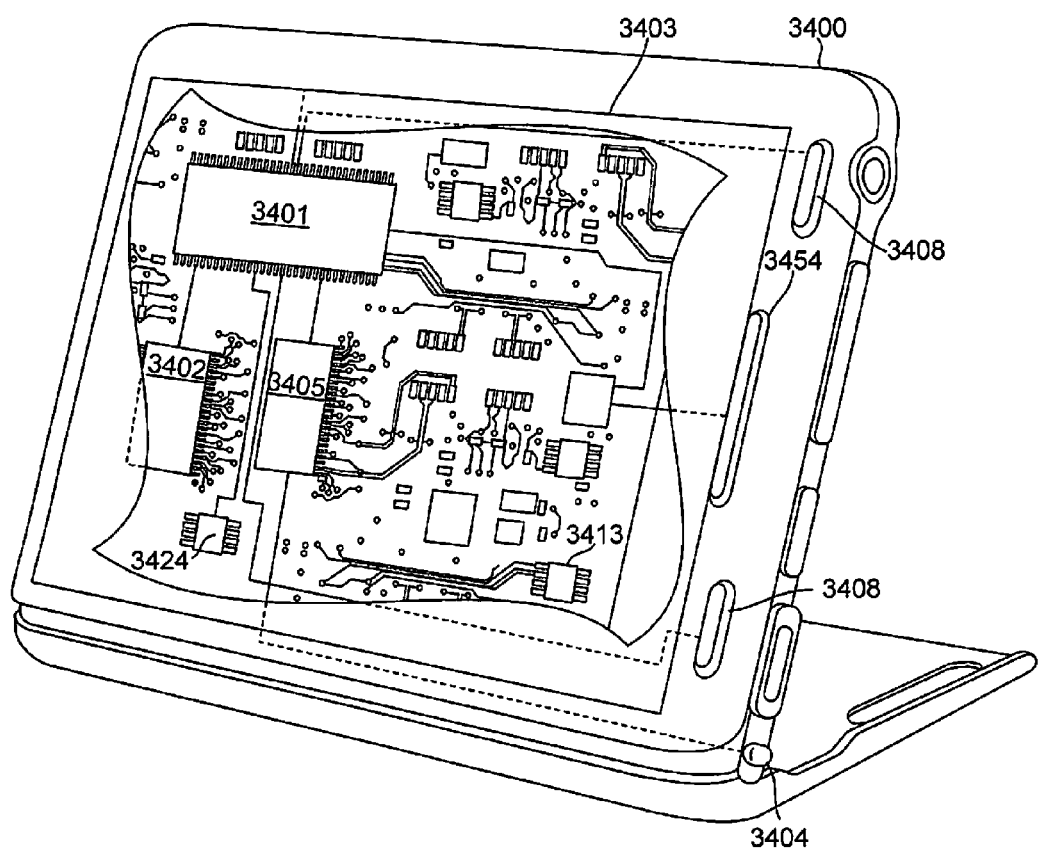
FIG. 34 illustrates an embodiment mobile communication device for interacting with a precision measurement dispenser device according to the various embodiments.

The various embodiments may be implemented on a variety of mobile computing devices, an example of which is illustrated in FIG. 34. Specifically, FIG. 34 is a system block diagram of a mobile transceiver device in the form of a smartphone/cell phone 3400 suitable for use with any of the embodiments. The cell phone 3400 may include a processor 3401 coupled to internal memory 3402, a display 3403, and to a speaker 3454. Additionally, the cell phone 3400 may include an antenna 3404 for sending and receiving electromagnetic radiation that may be connected to a wireless data link and/or cellular telephone transceiver 3405 coupled to the processor 3401. Cell phones 3400 typically also include menu selection buttons or rocker switches 3408 for receiving user inputs.

A typical cell phone 3400 also includes a sound encoding/decoding (CODEC) circuit 3424 which digitizes sound received from a microphone into data packets suitable for wireless transmission and decodes received sound data packets to generate analog signals that are provided to the speaker 3454 to generate sound. Also, one or more of the processor 3401, wireless transceiver 3405 and CODEC 3424 may include a digital signal processor (DSP) circuit (not shown separately). The cell phone 3400 may further include a peanut or a ZigBee transceiver (i.e., an IEEE 802.15.4 transceiver) 3413 for low-power short-range communications between wireless devices, or other similar communication circuitry (e.g., circuitry implementing the Bluetooth® or WiFi protocols, etc.).

The preceding description of the embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the following claims and the principles and novel features disclosed herein. Further, any reference to claim elements in the singular, for example, using the articles "a," "an," or "the" is not to be construed as limiting the element to the singular.

What is claimed is:

1. A precision measurement dispenser device, comprising:
   a storage container comprising:
      at least one storage compartment for receiving and holding therein a quantity of material to be dispensed;
      a dispensing mechanism within the at least one storage compartment, wherein the dispensing mechanism includes a delivery auger extending in its entirety parallel to two agitators on opposed sides of the delivery auger; and
      a dispensing port at a lower end of the storage container, wherein rotation of the delivery auger moves material within the at least one storage compartment to the dispensing port; and
   a base unit configured to receive the storage container removably secured thereon, the base unit comprising:
      a controller directing operation of the dispensing mechanism, wherein the controller activates the dispensing mechanism to cause the dispensing mechanism to dispense a select quantity of the material through the dispensing port.

2. The device of claim 1, further comprising a display operatively connected with the controller.

3. The device of claim 1, further comprising an electronic storage operative to store volumetric unit to mass unit conversion factors for one or more types of ingredients configured to be the material within the at least one storage compartment, wherein the controller accesses the electronic storage in directing the operation of the dispensing mechanism.

4. The device of claim 3, wherein the electronic storage is further operative to store at least one recipe consisting of a plurality of ingredients and corresponding amounts of the ingredients to be dispensed.

5. The device of claim 1, wherein the at least one storage compartment is configured to be interchangeable.

6. The device of claim 1, wherein the at least one storage compartment comprises a plurality of storage compartments mounted for movement relative to the base unit so as to position a single selected storage compartment at a time adjacent the base unit.

7. The device of claim 1, wherein the at least one storage compartment comprises a plurality of storage compartments; and
   the base unit is movable so as to position the base unit adjacent a single selected storage compartment at a time.

8. The device of claim 7, wherein the base unit is movable along a rail.

9. The device of claim 1, wherein the base unit further comprises a motor unit for cooperating with and operating the dispensing mechanism.

10. The device of claim 1, wherein the storage container includes an airtight cover providing an airtight seal for the at least one storage compartment.

11. The device of claim 10, wherein the at least storage container is operatively connected to a vacuum means.

12. The device of claim 1, wherein the storage container further comprises a storage recess configured to retain a desiccant or a humectant.

13. The device of claim 1, wherein the storage container is operatively associated with a temperature control mechanism.

14. The device of claim 1, wherein the storage container further comprises a-motor unit for cooperating with and operating the dispensing mechanism.

15. The device of claim 1, wherein the storage container further comprises an identification element; and
   the base unit comprises a reader for the identification element in communication with the controller.

16. The device of claim 15, wherein the identification element is at least one type of identifier selected from the group consisting of barcodes, QR codes, radio frequency identification (RFID) tags, near field communication (NFC) tags, and Bluetooth low energy (BLE) tags.

17. The device of claim 1, further comprising a transparent portion in the storage container for viewing the material stored therein.

18. The device of claim 1, wherein the base unit further comprises a display operatively connected with the controller.

19. The device of claim 1, wherein the storage container further comprises at least one labeling element selected from the group consisting of a stick-on label portion, magnetic labels, label frames for holding printed labels, dry-erase portions for hand labeling, and chalkboard portions for hand labeling.

20. The device of claim 1, wherein the base unit further comprises:
   a scale for weighing material dispensed by the dispensing mechanism, the scale being operative to provide feedback to the controller for monitoring the quantity of the material dispensed by the dispensing mechanism.

21. The device of claim 3, further comprising:
a wireless transceiver attached to a processor of the controller and configured for communication with an external network.

22. The device of claim 21, wherein the processor is configured with processor-executable instructions configured to perform operations comprising:
downloading, from the external network via the wireless transceiver, at least one recipe consisting of a plurality of ingredients and corresponding amounts of the ingredients to be dispensed; and
storing the at least one recipe in the electronic storage.

23. The device of claim 22, wherein the processor is configured with the processor-executable instructions configured to perform the operations comprising:
updating the ingredients of the at least one recipe from the external network via the wireless transceiver.

24. The device of claim 1, wherein the base unit further comprises:
a user interface for data entry to the controller, wherein an input section of the controller is configured to receive data from the user interface indicating a type of ingredient of the material and a desired quantity of material to be dispensed expressed in volumetric units, wherein the controller is configured to convert the expressed volumetric units to corresponding weight units of the material to be dispensed.

25. The device of claim 1, wherein the dispensing mechanism includes a precision auger smaller than the delivery auger.

26. The device of claim 1, wherein the at least one storage compartment further comprises:
at least two segregated compartments, wherein each of the at least two segregated compartments include separate ones of the dispensing mechanism and the dispensing port.

27. The device of claim 26, wherein only one compartment at a time, of the at least two segregated compartments, is mechanically coupled with the base unit.

* * * * *